(12) United States Patent
Gupta et al.

(10) Patent No.: US 10,747,758 B2
(45) Date of Patent: Aug. 18, 2020

(54) METHODS AND SYSTEMS FOR IDENTIFYING AN INFORMATION RESOURCE FOR ANSWERING NATURAL LANGUAGE QUERIES

(71) Applicant: Rovi Guides, Inc., San Carlos, CA (US)

(72) Inventors: Vikram Makam Gupta, Bangalore (IN); Vishwas Sharadanagar Panchaksharaiah, Tiptur (IN)

(73) Assignee: Rovi Guides, Inc., San Jose, CA (US)

( * ) Notice: Subject to any disclaimer, the term of this patent is extended or adjusted under 35 U.S.C. 154(b) by 828 days.

(21) Appl. No.: 15/143,105

(22) Filed: Apr. 29, 2016

(65) Prior Publication Data

US 2017/0316085 A1 Nov. 2, 2017

(51) Int. Cl.
*G06F 16/242* (2019.01)
(52) U.S. Cl.
CPC .................. *G06F 16/243* (2019.01)
(58) Field of Classification Search
CPC .................................................. G06F 17/30401
USPC ....................................................... 707/765
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0069880 A1* | 4/2003 | Harrison | G06F 16/3334 |
| 2005/0251827 A1 | 11/2005 | Ellis et al. | |
| 2007/0022109 A1* | 1/2007 | Imielinski | G06F 17/30401 |
| | | | 707/999.004 |
| 2007/0157281 A1* | 7/2007 | Ellis | H04N 7/17309 |
| | | | 725/134 |
| 2009/0292696 A1* | 11/2009 | Shuster | G06F 17/30867 |
| | | | 707/999.003 |
| 2010/0153885 A1 | 6/2010 | Yates | |
| 2012/0284254 A1* | 11/2012 | Garg | G06F 17/30654 |
| | | | 707/717 |

* cited by examiner

*Primary Examiner* — Pierre M Vital
*Assistant Examiner* — Andrew N Ho
(74) *Attorney, Agent, or Firm* — Haley Guiliano LLP

(57) ABSTRACT

A media guidance application may detect that results provided in response to a natural language query entered by the user are not relevant to the user. The media guidance application may then identify a media asset type and a media asset name that corresponds to the natural language query. Based on the media asset type and the media asset name, the media guidance application may select an information resource, transmit the natural language query to the information resource, and retrieve and generate for display an answer to the natural language query from the information resource.

20 Claims, 8 Drawing Sheets

METHODS AND SYSTEMS FOR IDENTIFYING AN INFORMATION RESOURCE FOR ANSWERING NATURAL LANGUAGE QUERIES

BACKGROUND

In conventional systems, users have the ability to enter search queries for performing searches for a wide variety of information related to media. Because modern search engines can effectively associate a relevant result with one or two significant keywords, users may be able to quickly find relevant results for search queries describing simple concepts, which typically require a small number of significant keywords to describe. However, in order to describe a more complex concept, users may need to enter a query consisting of a mix of low and high-significance keywords. This type of query is frequently written in natural language. Conventional systems are unable to effectively identify relevant results to a natural language query. If the user does not identify a relevant result, the user may attempt to restructure the natural language query in an attempt to obtain a more relevant result set, which may further frustrate the user, as a conventional search engine is not likely to produce more relevant results in response to a restructuring of the natural language query.

SUMMARY

Accordingly, methods and systems are described for a media guidance system that can identify information resources for answering natural language queries. A user may enter a natural language query into a search engine. For example, the user may wish to determine the name of a Seinfeld episode in which Kramer, who is a character in the show, is hired to work for a company. A user may enter a natural language query such as "What's the name of the Seinfeld episode in which Kramer gets a job?" Should the user enter a subsequent and similarly structured query, the media guidance application may determine that the search results provided in response to the first natural language query is not relevant to the user. The media guidance application may then accurately identify a relevant information resource that can answer the natural language query by identifying high-significance keywords such as keywords relating to a media asset type and media asset name. The media guidance application may transmit the natural language query to the identified resource. For example, the media guidance application may determine that a specific online resource (e.g., "Seinfeld Forums," a forum specializing in Seinfeld-oriented trivia) is likely to provide an answer to the natural language query. The media guidance application may then retrieve the answer from the information resource and present the answer to the user.

A user of the media guidance system may use a search engine in order to determine an answer to a media-related question. For example, the user may have heard from a friend that an especially entertaining Seinfeld episode aired the night before in which the character Kramer finally found work. Wanting to see episode, the user may wish to identify the name of the episode, in order to determine whether the episode will air again. The user may also attempt to attempt to determine whether the episode is available on demand from a source of media. In an attempt to find the name of the episode, the user may speak, into a microphone, the query, "What's the name of the Seinfeld episode in which Kramer gets a job?" The media guidance application may then process the user's spoken query into a text-based natural language query, and input the natural language query into a search engine.

In response to receiving the query written by the user, the search engine may provide a set of results. However, as questions written in a natural language format usually consist of a higher number of low-significance keywords and a lower number of high-significance keywords, modern search engines are unable to consistently distinguish between low-significance and high-significance keywords to prioritize search results. For example, a search engine may not be able to determine that the word "job" is significantly more important to the understanding of the intended meaning of the query than is the word "name." Thus, for example, a document referencing the name of the episode (e.g., "Bizarro Jerry") may appear on the seventh page of the results. Because users typically do not review more than a couple of pages of results, the user may decide, after reviewing the first and second pages of results, that the user should rephrase the query in order to obtain a more relevant result set that would contain the answer the user hopes to find.

Thus, the user may restructure the query, and regenerate the search by entering the query "What's the name of the Seinfeld episode in which Kramer has a job in an office." The user may hope that by rewriting the query, the search engine will bring about a more relevant set of results.

The media guidance application detects that the user is entering multiple queries into the search engine. For example, the media guidance application may compare the two queries to determine whether the queries are similar or not. The media guidance application may use various methods to detect a similarity between queries. One method involves comparing the number of letters in common between the two queries and determining the amount of overlapping letters between the two queries. If the amount of overlap is significant, the media guidance application correctly determines that the user is unsuccessfully attempting to find an answer to a question by entering multiple queries targeting the same question.

The media guidance identifies high-significance keywords that are present in the context of the user's query and identifies a web resource that is most likely to provide results for the query. Specifically, the media guidance application identifies the type of the media and the name of the media. For example, the media guidance application may determine that the word "episode" corresponds to a "TV Series" media type, and that the word "Seinfeld" corresponds to "Seinfeld," the TV series.

The media guidance application then identifies a web resource that is known to contain information that is highly relevant to the media type and media name identified by the media guidance application. The media guidance application may use a database of web resources that are associated with media types and names. For example, the media guidance application may determine that a website (e.g., "Seinfeld Forum") contains a significant amount of information about the show "Seinfeld." By identifying one specific and highly relevant resource, the media guidance application ensures that a highly relevant result set is generated based on the user's query (e.g., "What's the name of the Seinfeld episode in which Kramer gets a job?"). Thus, the media guidance application overcomes a significant limitation of conventional search engines, which are unable to identify relevant information resources, such as websites and forums that are most likely to contain a relevant answer to the user's question. Next, the media guidance application may send the user's query to the identified web resource (e.g., the website "Seinfeld Forum"). The media guidance application may determine whether the user's question had been answered previously by a user of the website's forum by searching forum topics. Should the media guidance application determine that a similar or identical question had not been answered in the past, the media guidance application may post the question on the website's forum.

Finally, the media guidance application may return the answer from the web resource to the user. For example, the media guidance application may determine that a user of the website's forum posted an answer to the question. The media guidance application may then retrieve the answer and present the answer on the user's screen. Accordingly, the user may find out that the name of the episode in which Kramer finds a job is called "Bizarro Jerry." The media guidance application may subsequently present options to the user that allow the user to take action on the provided answer. For example, the media guidance application may provide an option to watch the episode "Bizarro Jerry" on an on-demand video service (e.g., Hulu), or to find upcoming air times of the episode.

In some aspects, a media guidance application that is executed by control circuitry of a user equipment receives a first natural language query from a user. Control circuitry and user equipment will be discussed in the detailed description with respect to FIGS. 9 and 10. In one example, the media guidance application may receive a natural language query from a user who is interested in determining the name of a Seinfeld episode in which the character Kramer is hired to work for a company. The media guidance application may receive a natural language query corresponding to the user's question by way of a user input entered via a user input device, such as a keyboard. For example, the media guidance application may receive a natural language query such as, "In which episode did Kramer get a job?" by way of an on-screen keyboard. Alternatively, the media guidance application may receive the natural language query via a microphone when the user speaks the natural language query instead.

The media guidance application retrieves a first search result for the first natural language query. For example, the media guidance application may, in response to receiving the natural language query "What's the name of the Seinfeld episode in which Kramer gets a job?" from the user, submit the natural language query to a search engine. The media guidance application may then receive a result generated by the search engine. For example, the media guidance application may retrieve a result associated with the Wikipedia entry for "Cosmo Kramer."

The media guidance application generates for display the first search result. For example, in response to receiving the natural language query "What's the name of the Seinfeld episode in which Kramer gets a job?" from the user, the media guidance application may generate for display, on a display screen, the first result. For example, the media guidance application may generate for display identifying information associated with the result corresponding to the Wikipedia entry about Cosmo Kramer. Because a conventional search engine may consider all keywords when ranking the results, the results, including the first result, may be irrelevant to the user.

The media guidance application receives a second natural language query from the user. For example, the media guidance application may receive a second natural language query from the user who, when the user does not consider the results provided in response to the first natural language query to be relevant. The user may attempt to restructure the natural language query in an order to procure more relevant results. For example, the user may find that the result corresponding to the natural language query "What's the name of the Seinfeld episode in which Kramer gets a job?" does not contain a relevant result. In such a case, the media guidance application may receive a second natural language query entered by the user, such as, "What's the name of the Seinfeld episode in which Kramer has a job in an office." The media guidance application may then repeat the process of retrieving and generating for display a search result corresponding to the second natural language query.

The media guidance application determines an association metric relating to a similarity between the first natural language query and the second natural language query. The media guidance application may compute a string distance metric between the first natural language query and the second natural language query to determine whether the user is attempting to unsuccessfully generate a relevant result for the same question using both the first and second natural language queries. For example, the media guidance application may determine that the first natural language query and the second natural language query share five words that are common to both queries. The media guidance application may then set the association metric to the result of the calculation of dividing the number of words common to both natural language queries by the number of words contained in the second natural language query. For example, the media guidance application may determine that the second natural language query contains sixteen words. The media guidance application may then set the association metric to the result of dividing the number of words common to both natural language queries (e.g., six words) by the number of words in the second natural language query (e.g., sixteen words). In this example, the result of the calculation is 0.375, and the media guidance application may set the association metric to the calculated value. A significant association metric may be indicative of the user unsuccessfully searching for an answer to the natural language query.

The media guidance application determines whether the association metric meets or exceeds a threshold. For example, the media guidance application may retrieve a threshold stored in a storage device, and compare the threshold to the association metric. The media guidance application may determine a threshold in a number of ways. The threshold may be based on the output of a function, the inputs of which may include any characteristics of the first natural language query and second natural language query, such as the character length of one or both queries, the number of keywords in one or both queries. The media guidance application may then store the user-defined threshold in storage, such as in storage further described in FIG. 9 and additionally, may associate the threshold with the user by storing the threshold in a profile associated with the user.

The media guidance application, in response to determining that the association metric meets or exceeds the threshold, performs a number of functions to retrieve an answer to the natural language query. In some embodiments, the media guidance application may identify a target media asset type corresponding to the second natural language query, in response to determining that the association metric meets or exceeds the threshold. For example, the media guidance application may, by performing an analysis of the keywords corresponding to the second natural language query "What's the name of the Seinfeld episode in which Kramer has a job in an office," determine that the second natural language query contains information about an episode. Further, the media guidance application may establish that an episode should be associated with a "TV Series" media type. By specifically searching for and identifying a media type in the second natural language query, the media guidance application may effectively begin to narrow down the number of information resources that are relevant to answering the second natural language query.

The media guidance application identifies a target media name corresponding to the second natural language query, in response to determining that the association metric meets or exceeds the threshold. In one example, after the media guidance application determines that the media type corresponding to the second natural language query is "TV Series," the media guidance application may identify media records in a directory of media asset names, stored in storage, that correspond to the "Kramer" keyword of the second natural language query. For example, the media guidance application may identify that the keyword "Kramer" corresponds to the TV Series show "Seinfeld." The net effect of this is that the media guidance application can limit the search for the answer to the natural language query to a few highly specific and highly relevant information resources.

The media guidance application accesses a database of information resources, wherein each information resource is associated with a media asset type, a media name, and an information resource locator. For example, the media guide application may determine that an information resource is associated with a media asset type corresponding to "TV Series," and media name "Seinfeld." The database of information resources may be stored in local storage, or may instead be stored in a remote location accessible via a communications network. The database of information resources may be curated manually, such as by an expert specializing in media; the database may be also be generated by a community of users, and may also be generated automatically by a crawler. An information resource may correspond to a website, an online forum, a message board, a discussion group, a social network, and an IP address of a different user, although other types of online sources may be used as the information resource.

The media guidance application retrieves, from the database of information resources, a target information resource associated with the target media asset type and target media asset name. For example, the media guide application may retrieve, from a database, the name of a target information resource that is associated with a media asset type corresponding to "TV Series," and media name "Seinfeld." For example, the media guide application may determine that the information resource name is "Seinfeld Forums," a popular Seinfeld-oriented web site hosted by the website www.TV.com. Therefore, the media guidance application can limit the search for the answer to the second natural language query to a highly specific and highly relevant resource that is most likely to produce an answer that is relevant to the user.

In some embodiments, the media guidance application transmits, to the target information resource, the second natural language query using a target information resource locator associated with the target information resource. For example, the media guidance application may determine that in order to answer the second natural language query (e.g., "What's the name of the Seinfeld episode in which Kramer has a job in an office?"), the media guidance application should transmit the second natural language query to a specific target information resource. For example, the media guidance application may determine that the second natural language query should be transmitted to a popular forum (e.g., "Seinfeld Forums"). The media guidance application may determine a target information resource locator associated with the target information resource. For example, the database of information resources may include an entry corresponding to the target information resource (e.g., "www.tv.com/seinfeld"), indicating the location to which the media guidance application may transmit the second natural language query. The media guidance application may then use an HTTP post command to transmit the second natural language query to the target information resource (e.g., www.tv.com/seinfeld).

In some embodiments, the media guidance application retrieves and generates for display an answer to the second natural language query from the target information resource. For example, upon detecting that a user of the "Seinology" website has responded to the question contained in the second natural language query, the media guidance application may retrieve the answer and generate the answer for display so that the user is provided with an answer to the second natural language query.

In some embodiments, the media guidance application determines the association metric by computing a string distance metric between the first natural language query and the second natural language query. A string distance metric may be calculated using any suitable approach, such as by utilizing a Levenshtein distance calculation, Damerau-Levenshtein distance calculation, Jaro-Winkler distance calculation, and the like. In some examples, the string distance may be calculated for the natural language query as a whole. Because users may introduce a relatively small number of structural changes into the ordering of keywords and into the keywords themselves in the second natural language query, as compared to the keywords in the first natural language query, computing the string distance between the resultant strings may be sufficient when determining whether the two natural language queries are similar, and thus reflect the user's wish to search for the same question via both the first and second natural language queries. The string distance between the two natural language queries may be expressed as a value in the range of zero and one, for example, a string distance value of 0.90 may be indicative of a high level of similarity between the two natural language queries.

The media guidance application computes the association metric by calculating a ratio of the computed string distance metric with respect to at least one of the string length of the first natural language query and the string length of the second natural language query. Two long natural language queries (e.g., language queries with 30 or more characters) characterized by a low computed string distance (e.g., 0.2) may still correspond to the same question that the user wishes to query, because there are many more ways of restructuring the second natural language query based on the first natural language query. By calculating a ratio of the computer string distance with respect to the string length of one of the natural language queries, the media guidance application may be able to better distinguish between pairs of natural language queries that correspond to the same question, regardless of the length of the second natural language query.

In some embodiments, the media guidance application determines the association metric by determining a first set of keywords present in the first natural language query. For example, by the process of tokenization, the media guidance application may break up the first natural language query into individual keywords to form a first set of keywords, which may include keywords such as "gets," "Seinfeld," "episode," and "job."

The media guidance application computes the association metric by determining a number of keywords in common between the first set of keywords and the second set of keywords. For example, if the first set of keywords contains the keywords "name," "Seinfeld," "episode," and "job," and the second set of keywords contains the keywords "name," "Seinfeld," "episode," and "work," the media guidance application may determine that three out of the four keywords in the first set are matched and thus are common to both the first and second natural language queries. The media guidance application may then calculate a ratio of the matched keywords with respect to the first set, the second set, or both sets. For example, the media guidance application may calculate a ratio between the number of matched keywords and the number of keywords in the second set. In this example, the media guidance application calculates the value of the ratio as 0.75. The media guidance application may then associate the value of the ratio with the association metric to indicate the similarity between the two natural language queries.

In some embodiments, the media guidance application retrieves, from the database of information resources, as the target information resource locator, an IP address of a second user. For example, other instances of the media guidance application may be accessible to other users who consume media. The media guidance application may keep a directory of users in local storage, or in remote storage, in order to select a user most likely to answer the second natural language query. The media guidance application associated with the second user may receive a natural language query and generate for display the natural language query. The second user, upon receiving the natural language query, may input an answer to the natural language query, and the media guidance application of the second user may then transmit the answer to the media guidance application of the first user.

In some embodiments, the media guidance application determines whether the second user is active by pinging the target information resource. Users may be subject to fluctuations in their availability, as well as their willingness to interact with the media guidance application and to answer queries. In order to guarantee that the second natural language query is answered promptly, the media guidance application may attempt to determine whether the second user is available or has been available recently. For example, using the IP address that the media guidance application retrieved from the directory of users, the media guidance application may use a ping command sent over the communications network in order to determine that a device associated with the second user is active, and therefore, the second natural language query is likely to be answered by the second user.

In some embodiments, the media guidance application receives a message from the target information resource, indicating that the second user is not active. For example, the media guidance application associated with the first user may ping the media guidance application associated with the second user. The media guidance application associated with the second user may transmit a message, indicating that the second user has last interacted with the media guidance application associated with the second user five days ago. Thus, the media guidance application associated with the first user may determine that the second user is unlikely to respond to the request within a reasonable amount of time.

In some embodiments, the media guidance application selects a second target resource associated with a third user in response to receiving the message. For example, when the media guidance application detects that the second user is not active, the media guidance application may select a third user from the directory of users. Using an analogous process as discussed above in relation to the second user, the media guidance application may ping the third user and determine that the third user is active (e.g., the third user may be watching television and may be actively interacting with the media guidance application associated with the third user).

In some embodiments, the media guidance application retrieves, when retrieving the target information resource, using the database of information resources, a first potential target information resource associated with the target media asset type and target media asset name. For example, the media guide application may retrieve an information resource that corresponds to "Seinfeld Forums." Because the database of information resources may contain multiple information resources corresponding to an identical media name and media type pairing, the media guidance application may retrieve, using the database of information resources, a second potential target information resource associated with the target media asset type and target media asset name. For example, the media guide application may retrieve an information resource that corresponds to "Seinology," which is a popular website hosted by www.seinology.com. The media guidance application may select the information resource to transmit the natural language query to, based on calculating significance values, as will be further explained below. Using the below-described approach, the media guidance application may select a media guidance application that is most likely to provide a prompt and correct answer to the user.

In some embodiments, the media guidance application calculates a first significance value associated with the first potential target information resource, wherein the first significance value predicts whether the second natural language query will be answered correctly and promptly using the first potential target information resource. For example, the media guidance application may determine various factors, which will be described in more detail below, that affect whether a natural language query posted to the "Seinfeld Forums" will be answered correctly and promptly.

In some embodiments, the media guidance application calculates a second significance value associated with the second potential target information resource, wherein the second significance value predicts whether the second natural language query will be answered correctly and promptly using the second potential target information resource. For example, the media guidance application may determine factors affecting whether a natural language query posted to the "Seinology" forum will be answered correctly and promptly. The media guidance application may use analogous methods to those described in relation to the first significance value in order to calculate the second significance value.

In some embodiments, the media guidance application retrieves the first potential target information resource when the first significance value is greater than the second significance value. For example, the media guidance application compares the first significance value to the second significance value and determines that the first significance value is greater than the second significance value, which reflects the likelihood that a question posted to the first potential target information resource will be answered promptly and correctly. In such a way, the media guidance application maximizes the likelihood that the second natural language query will be answered promptly and accurately.

In some embodiments, the media guidance application determines whether the first significance value is greater than the second significance value. For example, the media guidance application may determine the significance values using a question-answer rate. In this case, the media guidance application may determine that 80% of all questions submitted to the first potential target information resource (e.g., "Seinfeld Forums") are answered. Further, the media guidance application may determine that only 40% of all questions submitted to the second potential target information resource (e.g., "Seinology") are answered. The net effect of this is that the media guidance application is able to select an information resource that is most likely to provide a correct and prompt answer to the user's natural language query.

In some embodiments, the media guidance application calculates the first significance value based on one of a membership count associated with the target information resource, a question-answer rate associated with the target information resource, an average answer time associated with the target information resource, and a user preference value associated with the target information resource.

In some embodiments, when the media guidance application calculates the first significance value based on the membership count associated with the target information resource, a high membership count can be indicative of a higher significance value. For example, the media guidance application may set the significance value to a ratio reflecting a proportion of the membership count associated with the target information resource and a predetermined membership count associated with a group of information resources known to host large communities of users who provide quick and prompt replies to queries. Additionally, a larger membership is more likely to include expert users knowledgeable of specific topics that may be contained in a natural language query.

In some embodiments, when the media guidance application calculates the first significance value based on a question-answer rate associated with the target information resource, a high question-answer rate may be indicative of a high significance value. For example, the media guidance application may set the significance value to a ratio reflecting a proportion of answered queries to the total number of queries posted. In such a way, the media guidance application may attach higher significance to a robust forum in which users may actively monitor for unanswered questions, and a lower significance value to a stagnant forum in which users only occasionally respond to unanswered questions.

In some embodiments, when the media guidance application calculates the first significance value based on an average answer time associated with the target information resource, a low average answer time rate may be indicative of a high significance value. For example, the media guidance application may measure the average answer time by calculating the average amount of time between the posting of a natural language query and the posting of an answer to the natural language query.

In some embodiments, the media guidance application calculates the first significance value based on a user preference value associated with the target information resource. For example, the media guidance application may analyze the user's web browsing history to determine a set of information resources that are frequently visited by the user. The fact that a user accessed an information resource may be indicative of the user trusting the information contained by that information resource.

In some embodiments, the media guidance application calculates the first significance value based on one of a membership count associated with the target information resource, a question-answer rate associated with the target information resource, an average answer time associated with the target information resource, and a user preference value associated with the target information resource.

In some embodiments, when the media guidance application calculates the first significance value based on the membership count associated with the target information resource, a high membership count can be indicative of a higher significance value. For example, the media guidance application may set the significance value to a ratio reflecting a proportion of the membership count associated with the target information resource and a predetermined membership count associated with a group of information resources known to host large communities of users who provide quick and prompt replies to queries. Additionally, a larger membership is more likely to include expert users knowledgeable of specific topics that may be contained in a natural language query.

In some embodiments, when the media guidance application calculates the first significance value based on a question-answer rate associated with the target information resource, a high question-answer rate may be indicative of a high significance value. For example, the media guidance application may set the significance value to a ratio reflecting a proportion of answered queries to the total number of queries posted. In such a way, the media guidance application may attach higher significance to a robust forum in which users may actively monitor for unanswered questions, and a lower significance value to a stagnant forum in which users only occasionally respond to unanswered questions.

In some embodiments, when the media guidance application calculates the first significance value based on an average answer time associated with the target information resource, a low average answer time rate may be indicative of a high significance value. For example, the media guidance application may measure the average answer time by calculating the average amount of time between the posting of a natural language query and the posting of an answer to the natural language query.

In some embodiments, the media guidance application calculates the first significance value based on a user preference value associated with the target information resource. For example, the media guidance application may analyze the user's web browsing history to determine a set of information resources that are frequently visited by the user. The fact that a user accessed an information resource may be indicative of the user trusting the information contained by that information resource.

In some embodiments, when transmitting the second natural language query, the media guidance application determines that the target information resource requires authentication. For example, most internet forums, social networking sites, and community websites require authentication before a user is able to transmit and retrieve information stored on the site. Thus, the media guidance application may determine that, in order to transmit the second natural language query, the media guidance application must first supply credential information to the target information resource.

In some embodiments, the media guidance application identifies an authentication key associated with the target information resource. For example, should media guidance application determine that an AUTH_REQ flag is set to "true," the media guidance application may query the information resource database to determine the appropriate credentials. The media guidance application may retrieve a username and password, both of which represent the credentials necessary to authenticate the user with the target information resource, from the database of information resources or alternatively, the profile of the user.

In some embodiments, the media guidance application transmits the authentication key using the target information resource locator. For example, the media guidance application may use the HTTP Secure protocol (HTTPS) in order to transmit the authentication key to the target information resource locator (e.g., "www.tv.com/seinfeld"), should the target information resource support the Secure Sockets Layer protocol (SSL).

In some embodiments, the media guidance application may receive a confirmatory message from the target information resource in response to transmitting the authentication key. For example, the media guidance application may receive from the target information resource (e.g., "www.tv.com/seinfeld") an indication that the authentication key has been received and the user is now authenticated. By receiving the confirmatory message, the media guidance application may proceed to transmit the second natural language query without the risk of the transmission failing.

In some embodiments, the media guidance application, in response to receiving the confirmatory message, transmits, to the target information resource, the second natural language query using the target information resource locator associated with the target information resource. As described above in reference to HTTPS, the media guidance application may use a POST command to transmit the second natural language query (e.g., "What's the name of the Seinfeld episode in which Kramer has a job in an office?"). The media guidance application may transfer the second natural language query in a manner that may then be transferred via the SSL protocol.

In some embodiments, the media guidance application identifies the authentication key by searching a profile associated with the user to identify a username and password combination associated with the target information resource. For example, the media guidance application may determine a username and password combination required to authenticate the user with the target information resource based on web browser cookies stored in local storage, which oftentimes contain credentials to information resources.

In some embodiments, when retrieving and generating for display the answer to the second natural language query, the media guidance application detects using the target information resource locator, a submission of the answer to the second natural language query at the target information resource. For example, the media guidance application may periodically poll the natural language query locator that the media guidance application previously received. In other examples, the media guidance application may receive a transmission of the answer for the second natural language query from the internet resource.

In some embodiments, the media guidance application, in response to detecting the submission of the answer, calculates a reliability metric of the answer. In some internet resources, such as internet forums and social networks, a correct answer to a natural language query is usually determined after a number of users submit an answer to the second natural language query. A correct answer may be detected using various methods. In one example, users may utilize an "up-vote" function to give weight to an answer that they consider to be correct, such that the number of up-votes associated with the answer determines the reliability metric.

In some embodiments, the media guidance application determines whether the reliability metric meets a reliability threshold. As described above, the reliability metric may be calculated using such factors as the number of up-votes associated with the answer, the total number of queries previously answered by a user associated with the answer, and the number of replies posted to the answer. The media guidance application may set thresholds for each factor when making the determination whether the answer is correct (i.e., whether the reliability metric meets a reliability threshold). For example, the media guidance application may determine, based on an analysis performed on previously answered questions, that a question that has received two up-votes has a fifty percent likelihood of being correct. Accordingly, when basing the reliability metric on up-votes, the media guidance application may then set the reliability threshold to a value of two (e.g., an answer must receive at least two up-votes to be considered correct).

In some embodiments, in response to determining that the reliability metric meets or exceeds the reliability threshold, the media guidance application retrieves the answer from the target information resource. For example, upon detecting that a user of the "Seinfeld Forums" website has responded to the question contained in the second natural language query, the media guidance application may retrieve the answer and generate the answer for display so that the user is provided with an answer to the second natural language query.

In some embodiments, in response to determining that the reliability metric meets or exceeds the reliability threshold, the media guidance generates for display the answer to the second natural language query. For example, the media guidance application may detect that a user of the "Seinfeld Forums" website provided an answer to the second natural language query (e.g., "What's the name of the Seinfeld episode in which Kramer has a job in an office?"). Further, the media guidance application may detect an answer (e.g., "Bizarro Jerry") provided by a user (e.g., "SeinfeldGuru"), and that the answer is associated with a high reliability metric because the associated user has provided one hundred responses in the past. The media guidance application may compare the reliability metric to a threshold (e.g., fifty answers), and may retrieve the answer from the server. The media guidance application may then generate the answer on the screen.

In some embodiments, the media guidance application may search the target information resource to determine whether the question corresponding to the second natural language query has previously been answered. For example, the media guidance application may crawl through forum postings and identify a forum topic, the subject text of which is similar to the keywords of the second natural language query. The media guidance application may use a process of determining an association metric between the second natural language query and each forum topic to identify a topic that is most likely to be relevant to the user's question.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for a media guidance system that can identify information resources for answering natural language queries. A user may enter a natural language query into a search engine. For example, the user may wish to determine the name of a Seinfeld episode in which Kramer, who is a character in the show, is hired to work for a company. A user may enter a natural language query such as "What's the name of the Seinfeld episode in which Kramer gets a job?" Should the user enter a subsequent and similarly structured query, the media guidance application may determine that the search result provided in response to the first natural language query is not relevant to the user. The media guidance application may then identify a relevant information resource that can answer the natural language query and transmit the natural language query to the identified information resource. For example, the media guidance application may determine that a specific online resource (e.g., "Seinfeld Forums," a forum specializing in Seinfeld-oriented trivia) is likely to provide an answer to the natural language query. The media guidance application may then retrieve the answer from the information resource and present the answer to the user.

The term "natural language query," as used herein, is a query that expresses a concept or question in a way typically spoken by users. For example, a natural language query may be expressed "What's the name of the Seinfeld episode in which Kramer gets a job?" In contrast, an analogous query that is not expressed in a natural language format may only recite certain keywords important to concepts that are present in the query. Such a query may be, for example "Seinfeld Kramer Job." A non-natural language query frequently does not give enough context to understand the question that the user is intending to ask. For example, in a non-natural language query "Seinfeld Kramer Job," the user may be inquiring about the "Nose Job" Seinfeld episode, in which Kramer convinces George's girlfriend to undergo rhinoplasty. However, the user may equally likely be inquiring about the episode in which Kramer gets a job at a corporation. Because non-natural language queries lack the context needed to determine the complex interplay between keywords, such queries are of limited utility when searching for anything but the simplest of questions and ideas.

Figure 1:
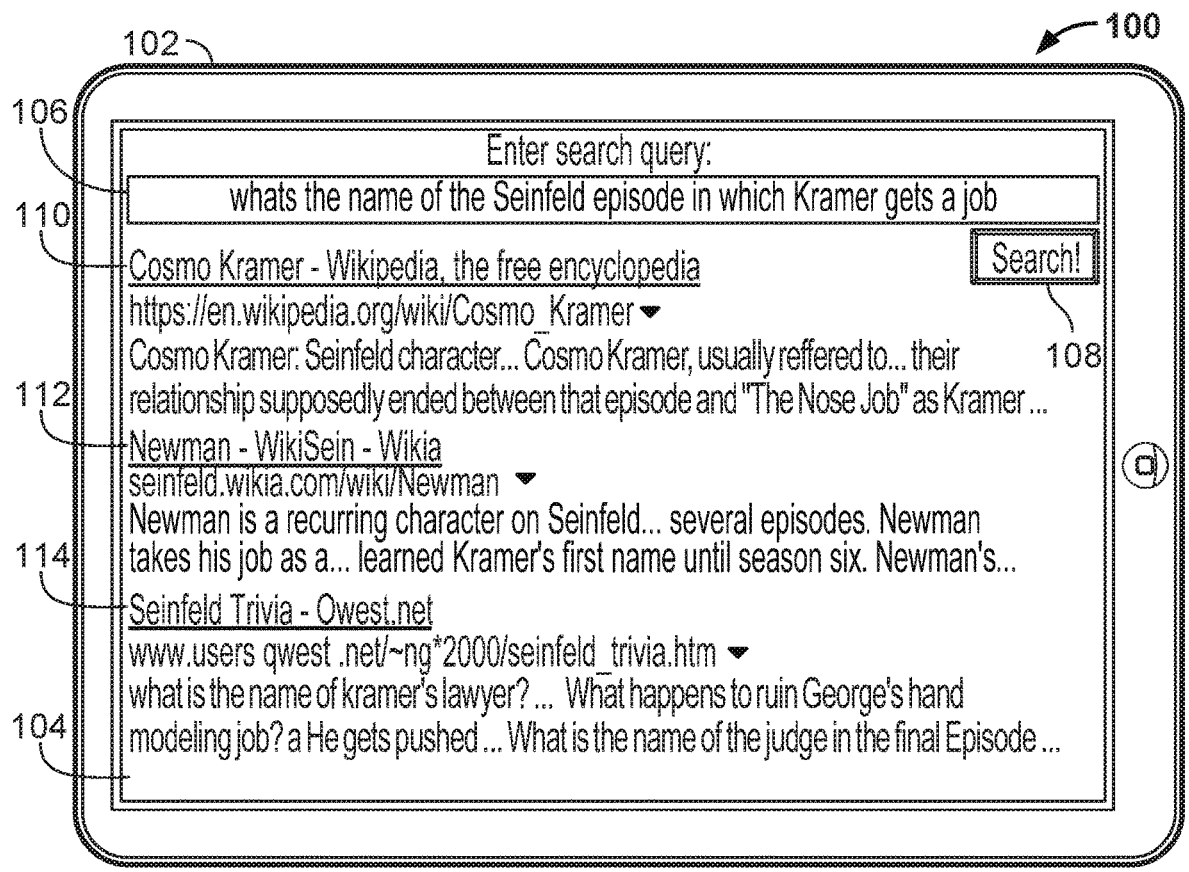
FIG. 1 shows an illustrative example of a display screen that may be used to receive and provide a response to a first natural language query, in accordance with some embodiments of the disclosure.

FIG. 1 shows an illustrative example of a display screen that may be used to receive and provide a response to a first natural language query, in accordance with some embodiments of the disclosure. In some embodiments of the disclosure, a media guidance application that is executed by control circuitry of user equipment 102 may receive a first natural language query from a user. The media guidance application, control circuitry, and user equipment 102 are all described further below with respect to FIGS. 4 and 5. For example, the media guidance application may receive natural language query 106 from a user who is interested in determining the name of a Seinfeld episode in which the character Kramer is hired to work for a company. The media guidance application may receive a natural language query corresponding to the user's question by way of a user input entered via a user input device, such as a keyboard. For example, the media guidance application may receive the first natural language query 106 such as, "In which episode did Kramer get a job?" by way of an on-screen keyboard. Alternatively, the media guidance application may receive the natural language query via a microphone when the user speaks the natural language query instead of entering it using the keyboard. Upon receiving the first natural language query, the media guidance application may receive a user selection of button 108, which may indicate that the user has completed entering the first natural language query 106 and that the user is ready to review results corresponding to the first natural language query.

In some embodiments, the media guidance application retrieves a first search result for the first natural language query. For example, the media guidance application may, in response to receiving the natural language query 106 (e.g., "What's the name of the Seinfeld episode in which Kramer gets a job?") from the user, submit the natural language query to a search engine. The media guidance application may then receive a result generated by the search engine. For example, the media guidance application may retrieve a first result 110 associated with the Wikipedia entry for "Cosmo Kramer." The media guidance application may retrieve identifying information associated with the result (e.g., "Cosmo Kramer . . . their relationship supposedly ended between that episode and The Nose Job"), as well as a hyperlink associated with the result (e.g., "https://en.wikipedia.org/wiki/Cosmo_Kramer") such that the media guidance application can provide an option to the user to retrieve the information page referenced by the hyperlink. The media guidance application may also retrieve the identifying information so that the user is able to quickly determine whether a result answers his or her natural language query. The media guidance application may utilize a plug-in to both transmit the natural language query to a search engine (e.g., the Google search engine), and receive the result from the search engine, in such a way that the process of entering the natural language query and receiving the results appears to be seamless to the user.

In some embodiments, the media guidance application generates for display the first search result. For example, in response to receiving first natural language query 106 (e.g., "What's the name of the Seinfeld episode in which Kramer gets a job?") from the user, the media guidance application may generate for display, on touch screen 104, first result 110. For example, the media guidance application may generate for display identifying information associated with the result corresponding to the Wikipedia entry about Cosmo Kramer. The media guidance application may include a hyperlink associated with the result, and may retrieve the information page associated with the result so that the user is able to verify whether the result is relevant to the natural language query. The media guidance application may retrieve second result 112 and third result 114 in a ranked manner such that the results that are more likely to be relevant to the user are displayed first.

Figure 2:
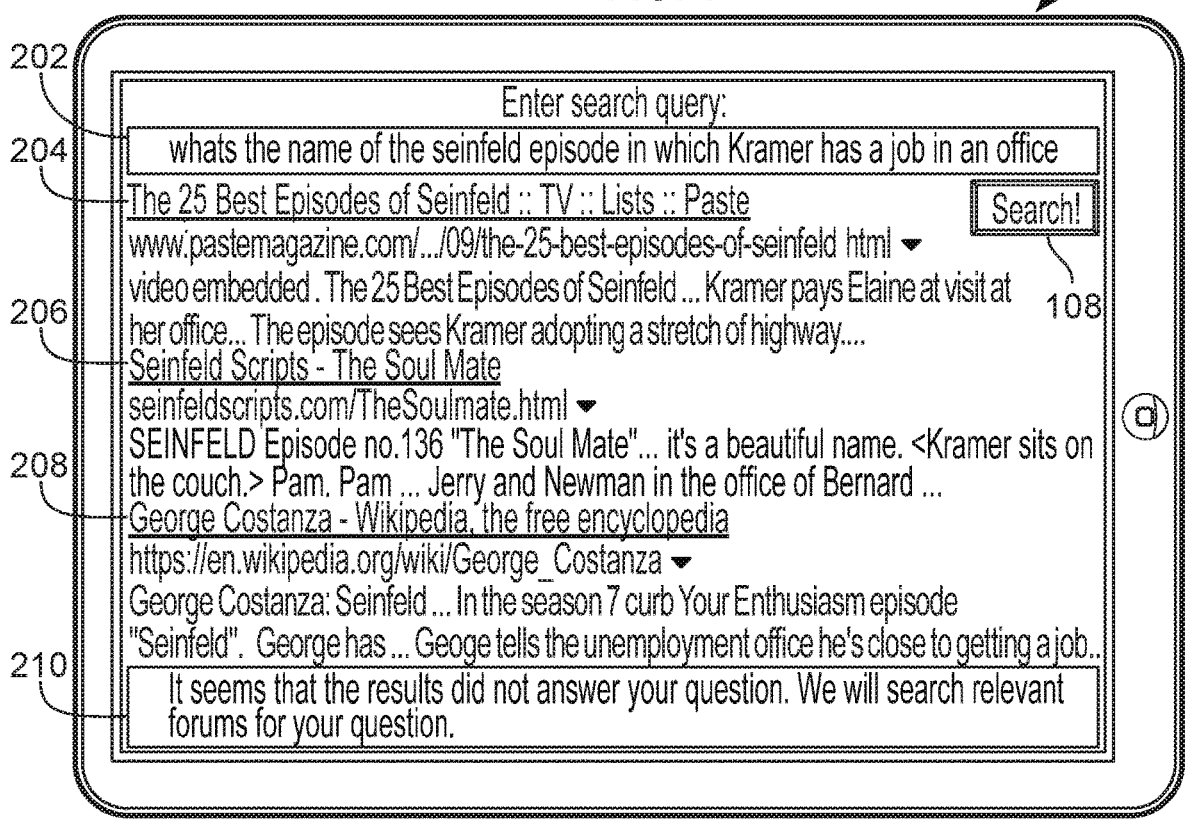
FIG. 2 shows an illustrative example display screen that may be used to receive a second natural language query, in accordance with some embodiments of the disclosure.

FIG. 2 shows an illustrative example display screen that may be used to receive a second natural language query, in accordance with some embodiments of the disclosure. In some embodiments, the media guidance application receives second natural language query 202 from the user. For example, the media guidance application may receive second natural language query 202 when the user does not consider the results provided in response to the first natural language query to be relevant. The user may attempt to restructure first natural language query 106 in an order to procure more relevant results. For example, the user may find that the result corresponding to first natural language query 106 (e.g., "What's the name of the Seinfeld episode in which Kramer gets a job?") does not contain a relevant result. In such a case, the media guidance application may receive second natural language query 202 entered by the user, such as "What's the name of the Seinfeld episode in which Kramer has a job in an office." The media guidance application may then repeat the process of retrieving and generating for display a search result corresponding to second natural language query 202. For example, upon receiving a user selection of button 108, indicating that the user has finished entering second natural language query 202, the media guidance application may retrieve and generate for display results 204, 202, and 208.

In some embodiments, the media guidance application determines an association metric relating to a similarity between first natural language query 106 and second natural language query 202. As used herein, an "association metric" is a measure by which the similarity between any two text strings, such as two natural language queries, may be established. The association metric may be a numeric figure between a range. The media guidance application may compute a string distance metric between first natural language query 106 and second natural language query 202 to determine whether the user is attempting to unsuccessfully generate a relevant result for the same question using both the first and second natural language queries. As used herein, a "string distance metric" is a calculated quantity that determines whether two text strings, such as two natural language queries, are similar. For example, the media guidance application may determine that first natural language query 106 and second natural language query 202 share five words that are common to both natural language queries. The media guidance application may then set the association metric to the result of the calculation of dividing the number of words common to both natural language queries by the number of words contained in the second natural language query. For example, the media guidance application may determine that second natural language 202 query contains sixteen words. The media guidance application may then set the association metric to the result of dividing the number of words common to both natural language queries (e.g., six words) by the number of words in the second natural language query (e.g., sixteen words). In this example, the result of the calculation is 0.375, and the media guidance application may set the association metric to this value.

In some embodiments, the media guidance application determines the association metric by computing a string distance metric between first natural language query 106 and second natural language query 202. A string distance metric may be calculated using any suitable approach, such as by utilizing a Levenshtein distance calculation, Damerau-Levenshtein distance calculation, Jaro-Winkler distance calculation, and the like. In some examples, the string distance may be calculated for each of the totality of the first and second natural language queries 106 and 202. For example, when first natural language query 106 corresponds to "What's the name of the Seinfeld episode in which Kramer gets a job?" and second natural language query 202 corresponds to "What's the name of the Seinfeld episode in which Kramer has a job in an office," the media guidance application may first pre-process the natural language queries by removing spaces, formatting, and insignificant keywords in order to remove characters that are not relevant to comparing two keywords for the purpose of determining their intended meaning. By this process, articles (e.g., "a" and "the") and punctuation marks (e.g., commas and contractions) are removed from the natural language queries, because the user is likely to arbitrarily enter arbitrary punctuation in one natural language query but not the other. In this example, the media guidance application may reduce first natural language query 106 to "whatsnameofseinfeldepisodeinwhichkramergetsjob" after processing the keywords present in first natural language query 106. Likewise, the media guidance application may reduce second natural language query 202 to "whatsnameofseinfeldepisodeinwhichkramkerhasjobinoffice" after processing the keywords in the natural language query. Because users may introduce a relatively small number of structural changes into the ordering of keywords and into the keywords themselves in second natural language query 202, as compared to the keywords in first natural language query 106, computing the string distance between the resultant strings may be sufficient when determining whether the two natural language queries are similar, and thus reflect the user's wish to search for the same question in both the first and second natural language queries. The string distance between the two natural language queries may be expressed as a value in the range of zero and one, for example, a string distance value of 0.90 may indicate a high level of similarity between the two natural language queries.

In some embodiments, the media guidance application computes the association metric by calculating a ratio of the computed string distance metric with respect to at least one of the string length of first natural language query 106 and the string length of second natural language query 202. Two long natural language queries (e.g., language queries with 30 or more characters) that are characterized by a low computed string distance (e.g., 0.3) may still correspond to the same question, because there are many more ways of restructuring second natural language query 202 based on first natural language query 106. Similarly, two short natural language queries (e.g., language queries less than 30 characters) characterized by a high computed string distance (e.g., 0.8) may not necessarily correspond to the same question because there are many fewer ways of restructuring second natural language query 202 based on first natural language query 106, and even a small restructuring may be indicative of the user changing the intended question of the natural language query. Thus, by calculating a ratio of the computer string distance with respect to the string length of one of the natural language queries, the media guidance application may be able to better identify pairs of natural language queries that correspond to the same question.

In some embodiments, the media guidance application determines the association metric by determining a first set of keywords present in first natural language query 106. For example, by the process of tokenization, the media guidance application may break up first natural language query 106 into individual keywords to form a first set of keywords, which may include keywords such as "gets," "Seinfeld," "episode," and "job." Similarly, the media guidance application may determine a second set of keywords present in second natural language query 202 by breaking up second natural language query 202 into individual keywords to form a second set of keywords, which may include keywords such as "has," "Seinfeld," "episode," and "work." The media guidance application may compute the association metric by determining a number of keywords in common between the first set of keywords and the second set of keywords. The media guidance application may process each keyword to maximize the probability that non-identical keywords relating to the same question in both queries are successfully matched. For example, the media guidance application may ensure that punctuation is removed from each keyword, because the user may relate to the same word by inputting keywords that include arbitrary punctuation structures. In some examples, the media guidance application may remove keywords of low significance such as articles (e.g., "a" and "the").

In some embodiments, the media guidance application may process keywords and identify the parts of speech (e.g., nouns, verbs, adjectives, etc.) to which each keyword belongs to. Further, the media guidance application may process each keyword relating to an identified part of speech such that the keyword appears in the base or infinitive case. For example, the media guidance application may detect the keywords "gets" and "got" in the set of keywords. Using a dictionary, the media guidance application may determine that both keywords relate to the infinitive word form "have," and may replace both keywords with the infinitive form. In such a way, media guidance application may ensure that a rephrasing of the same word in both queries can be detected and considered when the media guidance application calculates the association metric.

In some embodiments, the media guidance application computes the association metric by determining a number of keywords in common between the first set of keywords and the second set of keywords. For example, if the first set of keywords contains the keywords "name," "Seinfeld," "episode," and "job," and the second set of keywords contains the keywords "name," "Seinfeld," "episode," and "work," the media guidance application may determine that three out of the four keywords in the first set are matched and are thus common to both the first and second natural language queries. The media guidance application may then calculate a ratio of the matched keywords with respect to the first set, the second set, or both sets. For example, the media guidance application may calculate a ratio between the number of matched keywords and the number of keywords in the second set. In this example, the media guidance application calculates the value of the ratio as 0.75. The media guidance application may then associate the value of the ratio with the association metric to indicate the similarity between the two natural language strings.

In some examples, the media guidance application searches a thesaurus to determine a match between any unmatched keywords between the first set and the second set of keywords. For example, if the media guidance application does not match the keyword "job" in the first set to any of the unmatched keywords in the second set, the media guidance application may search a thesaurus to determine synonyms for the unmatched keyword, such as "work," "profession," and "role," and attempt to match the synonyms of the keyword from the first set to any unmatched keywords of the second set. By doing so, the media guidance application may ensure that any rephrasing of words performed by the user in second natural language query 202 is correlated to the keywords in first natural language query 106. For example, because the second set contains the keyword "work," and the set of synonyms for the keyword "job" from the first set also contains the keyword "work," media guidance application may determine that in spite of semantic dissimilarity between keywords "work" and "job," both keywords relate to the same concept. The media guidance application may thus determine that the "work" and "job" keywords match, and may adjust the number of keywords in common between the first and second set of keywords.

In some embodiments, the media guidance application determines whether the association metric meets or exceeds a threshold. For example, the media guidance application may retrieve a threshold stored in a storage device, and compare the threshold to the association metric. The media guidance application may determine a threshold in a number of ways. The threshold may be based on the output of a function, the inputs of which may include any characteristics of first natural language query 106 and second natural language query 202, such as the character length of one or both queries or the number of keywords in one or both queries. The function may relate the inputs to a threshold such that an association metric that meets or exceeds the threshold is more likely than not to indicate that first natural language query 106 and second natural language query 202 relate to the same question. The function may map the inputs to a threshold such that an association metric that meets or exceeds the threshold is more likely than not to indicate that first natural language query 106 and second natural language query 202 relate to the same question. In one example, the threshold may be determined through crowdsourcing, based on the behavior of other users, each of which may be utilizing a separate instance of the media guidance application for inputting queries. In some examples, the threshold may be static. In other examples, the media guidance application may provide an option for the user to define the threshold. The media guidance application may then store the user-defined threshold in storage, such as in storage 908, further described in relation to FIG. 9, and additionally, the media guidance application may associate the threshold with the user by storing the threshold in a profile associated with the user.

In some embodiments, the media guidance application, upon determining that the association metric meets or exceeds the threshold, generates for display message 210, indicating that media guidance application is able to identify an information resource that can answer the second natural language query. Should a user not be interested in having the media guidance application identify an information resource for answering the second natural language query, the media guidance application may receive a user input cancelling any further processing with respect to the second natural language query. Otherwise, the media guidance application can automatically identify a relevant information resource and transmit the query to that resource.

In some embodiments, the media guidance application, in response to determining that the association metric meets or exceeds the threshold, performs a number of functions to retrieve an answer to the natural language query. In some embodiments, the media guidance application may identify a target media asset type corresponding to second natural language query 202, in response to determining that the association metric meets or exceeds the threshold. For example, the media guidance application may determine, by performing an analysis of the keywords corresponding to second natural language query 202 "What's the name of the Seinfeld episode in which Kramer has a job in an office," that second natural language query 202 contains information about an episode. Further, the media guidance application may establish that an episode should be associated with a "TV Series" media type. The media guidance application may store, in storage 908, a directory of media asset types. For example, the media guidance application may associate, in the directory of media asset types, keywords that correspond to each respective asset type. For example, the media guidance application may associate a "TV Series" media type with keywords such as "episode," "season," "finale," "pilot," and "show." Meanwhile, the media guidance application may correspond a "music" media type with keywords such as "song," "album," "artist," and "single."

In some examples, media guidance application attempts to identify each keyword of second natural language query 202, in order to increase the likelihood that the media guidance application identifies the most relevant media asset type, even if some keywords correspond to multiple media asset types. For example, in the natural language query "Who plays Lester in Fargo?" the keyword "Fargo" may relate to both the "Movies" media asset type, because Fargo is a 1996 film, as well as to the "TV Series" media asset type, because "Fargo" is a television show that premiered in 2014. The media guidance application may analyze other keywords present in the second natural guidance query to resolve the ambiguity. For example, the media guidance application may determine that the keyword "Lester" in second natural language query 202 relates to "TV Series," but does not relate to "Movies," because the keyword "Lester" may relate to a main character in the "Fargo" TV Series, but may not relate to any keywords associated with media asset type "Movies." Thus, the media guidance application is able to more effectively determine the media asset type relevant to second natural language query 202 by analyzing multiple keywords.

In some embodiments, the media guidance application identifies a target media name corresponding to second natural language query 202, in response to determining that the association metric meets or exceeds the threshold. In one example, after the media guidance application determines that the media type corresponding to second natural language query 202 is "TV Series," the media guidance application may identify media records in a directory of media asset names, stored in storage 908, that correspond to the "Kramer" keyword of second natural language query 202. For example, the media guidance application may identify that the keyword "Kramer" corresponds to the TV Series show "Seinfeld." The media guidance application may determine the media asset name using various methods. For example, the media guidance application can store, in the directory of media asset names, a number of corresponding keywords of different attributes, such as "actors," "character names," "episode names," "host," and the like. In one example, the media asset name "Seinfeld" may be correlated to the keyword "Kramer," which is of the "character name" attribute. In such a way, the media guidance application may effectively organize and maintain keywords in the directory of media asset names.

In some examples, the media guidance application determines that a keyword is associated with multiple media asset names of the same media type. For example, in the natural language query "In which episode Jerry gets a new couch?", the media guidance application may associate the keyword "Jerry" with both the media asset name "Seinfeld," via the "actor" attribute, as discussed above, as well as with media asset name "Jerry Springer Show," via the "host" attribute, which may correspond to Jerry Springer, the host of the show the "Jerry Springer Show." In such a case, the media guidance application may attempt to identify other keywords in the natural language query that would be characteristic of either the "Seinfeld" or the "Jerry Springer Show." When the media guidance application is unable to make this determination, because, for example, no other keywords present in the natural language query are distinctly related to a media asset name, the media guidance application may use other methods of determining the media asset name. For example, the media guidance application may query the profile associated with the user, which may be stored in storage, such as the storage depicted in FIG. 9, in order to determine a user viewing history. Should the media guidance application determine that the user has been binge watching episodes of "Seinfeld," but has not viewed any episodes of "The Jerry Springer Show," the media guidance application may correctly infer that second natural language query 202 corresponds to the "Seinfeld" media asset name. Should the media guidance application not be able to determine whether the user watches media asset "Seinfeld" more frequently than "The Jerry Springer Show," the media guidance application may use other methods, such as determining the popularity of each media asset. In this case "Seinfeld" is significantly more popular than "The Jerry Springer Show" and thus the media guidance application may identify the media asset name corresponding to second natural language query 202 as "Seinfeld." The media guidance application may maintain a list of statistics, such as popularity, air date, and ratings, in the media asset name directory, in order to facilitate the correct identification of media asset names corresponding with second natural language query 202.

In some embodiments, the media guidance application accesses a database of information resources, wherein each information resource is associated with a media asset type, a media name, and an information resource locator. As used herein, a "locator" refers to any information that may be used to locate a specific resource. For example, a URL address and an IP address may be used to locate a specific resource. Accordingly, in one example, the media guide application may determine that an information resource is associated with a media asset type corresponding to "TV Series," and media name "Seinfeld." The database of information resources may be stored in local storage, or may instead be stored in a remote location accessible via a communications network. The database of information resources may be curated manually, such as by an expert specializing in media, the database may be also be generated by a community of users, and may also be generated automatically by a crawler. An information resource may correspond to a website, an online forum, a message board, a discussion group, a social network, and an IP address of a different user, although other types of online sources may be used as the information resource. The media guidance application may integrate the previously described directories of media asset types, and media asset names with the database of information resources, such that all information resides in one database. Alternatively, the directory of media asset types and media asset names may reside in separate storage, but may reference entries in the information resource database using keys, links, or other references. The database of information resources may also contain an indicator, for each information resource, as to whether authentication is required. Further, the database may also contain the authentication information, including passwords and usernames. By identifying and accessing an information resource, the media guidance application is able to locate information and/or users who are most likely to answer the user's query, which conventional search engines are not able to perform.

In some embodiments, the media guidance application retrieves, from the database of information resources, a target information resource associated with the target media asset type and target media asset name. For example, the media guide application may retrieve, from a database, the name of a target information resource that is associated with a media asset type corresponding to "TV Series," and media name "Seinfeld." For example, the media guide application may determine that the information resource name is "Seinfeld Forums," a popular Seinfeld-oriented web site hosted by the website www.TV.com.

In some embodiments the media guidance application retrieves, when retrieving the target information resource, using the database of information resources, a first potential target information resource associated with the target media asset type and target media asset name. For example, the media guide application may retrieve an information resource that corresponds to "Seinfeld Forums." Because the database of information resources may contain multiple information resources corresponding to a given media name and media type pairing, the media guidance application may retrieve, using the database of information resources, a second potential target information resource associated with the target media asset type and target media asset name. For example, the media guide application may retrieve an information resource that corresponds to "Seinology," which is a popular website hosted by www.seinology.com. The media guidance application may select the information resource to transmit the natural language query to, based on calculating significance values, as will be further explained below. Using the below-described approach, the media guidance application may select a media guidance application that is most likely to provide a prompt and correct answer to the user.

In some embodiments, the media guidance application calculates a first significance value associated with the first potential target information resource, wherein the first significance value predicts whether second natural language query 202 will be answered correctly and promptly using the first potential target information resource. As used herein, a "significance value" is any quantity that reflects the likelihood that an answer submitted to an information resource will be answered promptly and correctly. For example, the media guidance application may determine factors affecting whether a natural language query posted to the "Seinfeld Forums" will be answered correctly and promptly.

In some embodiments, the media guidance application calculates the first significance value based on at least one of a membership count associated with the target information resource, a question-answer rate associated with the target information resource, an average answer time associated with the target information resource, and a user preference value associated with the target information resource.

When the media guidance application calculates the first significance value based on the membership count associated with the target information resource, a high membership count can be indicative of a high significance value. For example, the media guidance application may set the significance value to a ratio reflecting a proportion of the membership count associated with the target information resource and a predetermined membership count associated with a group of information resources known to host large communities of users who provide quick and prompt replies to queries. Additionally, a larger membership is more likely to include expert users knowledgeable of specific topics that may be contained in a natural language query, and thus an answer to a natural language query obtained from such a source is more likely to be factually correct.

In some embodiments, the media guidance application considers only an active membership count, because many membership accounts may become dormant over time. The media guidance application may make this determination by counting the number of distinct usernames associated with replies that had been posted within a predetermined period (e.g., the past two months).

When the media guidance application calculates the first significance value based on a question-answer rate associated with the target information resource, a high question-answer rate may be indicative of a high significance value. For example, the media guidance application may set the significance value to a ratio reflecting a proportion of answered queries to the total number of queries posted. In such a way, the media guidance application may attach higher significance to a robust forum in which users may actively monitor for new questions, and a lower significance value to a stagnant forum in which users only occasionally respond to new questions.

In some embodiments, the media guidance application considers only a question-answer rate associated with the target information resource for queries that had been posted within a predetermined period (e.g., the past two months), reflecting the amount of answer activity taking place. In such a way, the media guidance application is able to distinguish between presently active internet resources and internet resources that had been active at one point, but are no longer active.

When the media guidance application calculates the first significance value based on an average answer time associated with the target information resource, a low average answer time rate may be reflected in a high significance value. For example, media guidance application may measure the average answer time by calculating the average amount of time between the posting of a natural language query and the posting of an answer to the natural language query. In some examples, the media guidance application may only consider those answers that were determined to be correct (e.g., by up-voting answers) by the users of the internet resource, because the very first answer posted in response to a natural language query may not necessarily be the correct answer. By calculating the first significance value using the average answer time associated with the target information resource, the media guidance application is able to identify those information resources in which queries are answered promptly, thus increasing the likelihood that an answer to the second natural language can be promptly provided to the user.

In some embodiments, the media guidance application calculates the first significance value based on a user preference value associated with the target information resource. For example, the media guidance application may analyze the user's web browsing history to determine a set of information resources that are frequently visited by the user. The fact that a user had previously accessed an information resource may be indicative of the user trusting that information contained in that information resource. In some examples, the media guidance application may search the profile of the user to determine internet resources that the user has marked as favorites.

It should be noted that media guidance application may use one or more measures discussed above when calculating the first significance value. The media guidance application may also use other applicable measures to calculate the significance value.

In some embodiments, the media guidance application calculates a second significance value associated with the second potential target information resource, wherein the second significance value predicts whether second natural language query 202 will be answered correctly and promptly using the second potential target information resource. For example, the media guidance application may determine factors affecting whether a natural language query posted to the "Seinology" forum will be answered correctly and promptly. The media guidance application may use analogous methods to those described in relation to the first significance value in order to calculate the second significance value.

In some embodiments, the media guidance application determines whether the first significance value is greater than the second significance value. For example, the media guidance application may determine the significance values using a question-answer rate. In this case, the media guidance application may determine that 80% of the questions submitted to the first potential target information resource (e.g., "Seinfeld Forums") are answered. Further, the media guidance application may determine that only 40% of the questions submitted to the second potential target information resource (e.g., "Seinology") are answered. The net effect of this is that the media guidance application is able to select an information resource that is most likely to provide a correct and prompt answer to the user's natural language query.

In some embodiments, the media guidance application retrieves the first potential target information resource when the first significance value is greater than the second significance value. For example, the media guidance application then compares the first significance value to the second significance value and determines that the first significance value is greater than the second significance value, which reflects the likelihood that a question posted to the first potential target information resource will be answered more promptly and correctly than if posted in the information resource associated with the second significance value.

In some embodiments, the media guidance application transmits, to the target information resource, second natural language query 202 using a target information resource locator associated with the target information resource. For example, the media guidance application may determine that in order to answer second natural language query 202 (e.g., "What's the name of the Seinfeld episode in which Kramer has a job in an office?"), the media guidance application should transmit second natural language query 202 to a specific target information resource. For example, the media guidance application may determine that second natural language query 202 should be transmitted to a popular forum (e.g., "Seinfeld Forums"). The media guidance application may determine a target information resource locator associated with the target information resource. For example, the database of information resources may include an entry corresponding the target information resource (e.g., "www.tv.com/seinfeld") indicating the location to which the media guidance application may transmit second natural language query 202. The media guidance application may then use an HTTP post command to transmit second natural language query 202 to the target information resource (e.g., www.tv.com/seinfeld).

The media guidance application may transmit second natural language query 202 in a variety of manners. Because each individual information resource is likely to have specific requirements for transmitting a natural language query, the media guidance application may maintain customized plugins for each information resource. For example, some popular internet websites have an associated application program interface (API) that enables users to programmatically manipulate content and data on the website. Some websites allow for Hypertext Transfer Protocol (HTTP) post command to be sent via a script. Accordingly, the media guidance application may utilize a script, conformed to the requirements of an individual website, in order to transmit second natural language query 202.

In some embodiments, the media guidance application retrieves, from the database of information resources, as the target information resource locator, an IP address of a second user. For example, an instance of the media guidance application may be accessible to other users who consume media. The media guidance application may keep a directory of users in local storage, or in remote storage, in order to select a user most likely to answer second natural language query 202. The media guidance application associated with a second user may receive a natural language query and generate for display the natural language query. The second user, upon receiving the natural language query, may input an answer to the natural language query, the media guidance application of the second user may then transmit the answer to the media guidance application of the first user. Each entry in the directory of users may include an Internet Protocol (IP) address using which the media guidance application may communicate with the media guidance application of a remote user. Additionally, each entry of the directory may include the name of the corresponding user, geographic location information, topics of expertise, and various measures of the corresponding user's media consumption behavior and query answering metrics. Examples of measures of media consumption may include the number of hours watched per a given media asset or group of media assets. In one example, a user who has watched and rewatched every Seinfeld episode may have an association metric of "Seinfeld" consumption set as 132 hours. The media guidance application may use such metrics to identify those users who may be experts in certain media asset types or specific media assets of a particular name to ensure that a correct answer for a natural language query is obtained. In another example, the media application may collect interest and areas of expertise directly from users. For example, the media guidance application may enable users to select specific media assets in which users are most interested in, or ones the users consider themselves to be experts in. In one example, the media guidance application may receive input from the user indicating that the user considers himself or herself an expert in the "Seinfeld" series and "Curb Your Enthusiasm" series. Using this information allows the media guidance application to determine users who may not only be experts in specific media-related subject areas, but also users who may participate in discussions related to these subject areas, and may be likely to be willing and able to answer queries related to these subject areas.

In some embodiments, the media guidance application determines whether the second user is active by pinging the target information resource. As used herein, "pinging" refers to the process of querying a server or other computer on communications network 1014. Users may be subject to fluctuations in their availability and willingness to interact with the media guidance application and to answer queries. In order to guarantee that second natural language query 202 is answered promptly, the media guidance application may attempt to determine whether the second user is available or has been available recently. For example, using the IP address that the media guidance application retrieved from the directory of users, the media guidance application may use a ping command sent over the communications network in order to determine whether a device associated with the second user is active. Should the media guidance application be implemented on user television equipment 1002 of the second user, a simple ping command may be insufficient in determining whether the second user is active, because the set-top box may be constantly connected to the internet, even with the user not being present. In such a case, the media guidance application may transmit a ping message to the media guidance application associated with the second user in such a way that the media guidance application associated with the second user responds with a message relating to the second user's availability, such as the last time at which the second user interacted with the media guidance application associated with the second user.

In some embodiments, the media guidance application receives a message from the target information resource indicating that the second user is not active. For example, the media guidance application associated with the first user may ping the media guidance application associated with the second user. The media guidance application associated with the second user may transmit a message, indicating that the second user had last interacted with the media guidance application associated with the second user five days ago. Thus, the media guidance application associated with the first user may determine that the second user is unlikely to respond to the request within a reasonable amount of time. The media guidance application, may, for example, use statistical analysis of user interactions with media guidance applications to determine that, for example, a user who has not interacted with a media guidance application within a certain amount of time (e.g., five days) has a certain likelihood of responding in the next one day (e.g., 15% chance) of responding. Thus, the media guidance application may determine that the user is not active and is not likely to be active in the foreseeable future so as to answer corresponding to second natural language query 202 within a time period that may be acceptable to the user who submitted the natural language query (e.g., a time period of one day). The amount of time that is acceptable to the user may be set manually by the user and stored in the profile of the user in storage 908.

In some embodiments, the media guidance application selects a second target resource associated with a third user in response to receiving the message. For example, when the media guidance application detects that the second user is not active, the media guidance application may select a third user from the directory of users. Using an analogous process as discussed above in relation to the second user, the media guidance application may ping the third user and determine that the third user is active (e.g., the third user may be watching television and may be actively interacting with the media guidance application associated with the third user).

In some embodiments, the media guidance application transmits, to the second target resource, second natural language query 202 using a second target information resource locator associated with the second target resource. For example, the media guidance application may transmit second natural language query 202, "What's the name of the Seinfeld episode in which Kramer has a job in an office?" The media guidance application may also transmit its own IP address, so that the media guidance application associated with the third user is able to push a message with the answer to the natural language query to the user requesting the answer.

In some embodiments, when transmitting second natural language query 202, the media guidance application determines that the target information resource requires authentication. For example, most internet forums, social networking sites, and community websites require authentication before the user is able to transmit and retrieve information stored on the site. Thus, the media guidance application may determine that, in order to transmit second natural language query 202, the media guidance application must first supply credential information to the target information resource. The media guidance application may determine this based on information contained in the database of information resources. For example, the media guidance application may determine that the information resource corresponding to a popular forum (e.g., "Seinfeld Forums") requires authentication by determining whether an AUTH_REQ flag in the information database has been set.

In some embodiments, the media guidance application identifies an authentication key associated with the target information resource. As used herein, "an identification key" is any data, sent over communications network 1018, that allows one entity to be authentication with a second entity. For example, should media guidance application determine that the AUTH_REQ flag is set to "true," the media guidance application may query the information resource database to determine the appropriate credentials. The media guidance application may retrieve a username and password from the database of information resources or the profile of the user. The credentials need not be directly associated with the user. Because the user is unlikely to have personal credentials to more than a dozen information resources, the media guidance application may store and utilize generic credential information that may be used by a group of users. The media guidance application may then send an authentication key containing both the username and password in such a way that when the media guidance application transmits the authentication key to the target information resource, the target information resource may authenticate the user and enable the media guidance application to transmit and retrieve information, such as queries and answers.

In some embodiments, the media guidance application identifies the authentication key by searching a profile associated with the user to identify a username and password combination associated with the target information resource. For example, the media guidance application may determine a username and password combination required to authenticate the user with the target information resource based on web browser cookies, which oftentimes contain credentials to information resources.

In some embodiments, the media guidance application transmits the authentication key using the target information resource locator. For example, the media guidance application may use the HTTP Secure protocol (HTTPS) in order to transmit the authentication key to the target information resource locator (e.g., "www.tv.com/seinfeld"), should the target information resource support the Secure Sockets Layer protocol (SSL).

In some embodiments, the media guidance application may receive a confirmatory message from the target information resource in response to transmitting the authentication key. For example, the media guidance application may receive from the target information resource (e.g., "www.tv.com/seinfeld") an indication that the authentication key has been received and the user is now authenticated. By receiving the confirmatory message, the media guidance application may proceed to transmit second natural language query 202 without risk of the transmission failing. Additionally, when the media guidance application does not receive a confirmatory message, the media guidance application may attempt to resolve the issue. In one example, the media guidance application may, in response to determining that the media guidance application did not receive a confirmatory message within a predetermined amount of time (e.g., one second), select an alternative information resource. In a second example, the media guidance may instead generate a message on display indicating that the user's authentication information was not accepted. The media guidance application may further provide the user with the opportunity to update the credential information, and may also provide a link referencing the password reset page associated with the target information resource.

In some embodiments, the media guidance application, in response to receiving the confirmatory message, transmits, to the target information resource, second natural language query 202 using the target information resource locator associated with the target information resource. As described above in reference to HTTPS, the media guidance application may use a POST command to transmit second natural language query 202 (e.g., "What's the name of the Seinfeld episode in which Kramer has a job in an office?"). The media guidance application may process second natural language query 202 so that the second natural language query 202 may then be transferred via the SSL protocol.

Figure 3:
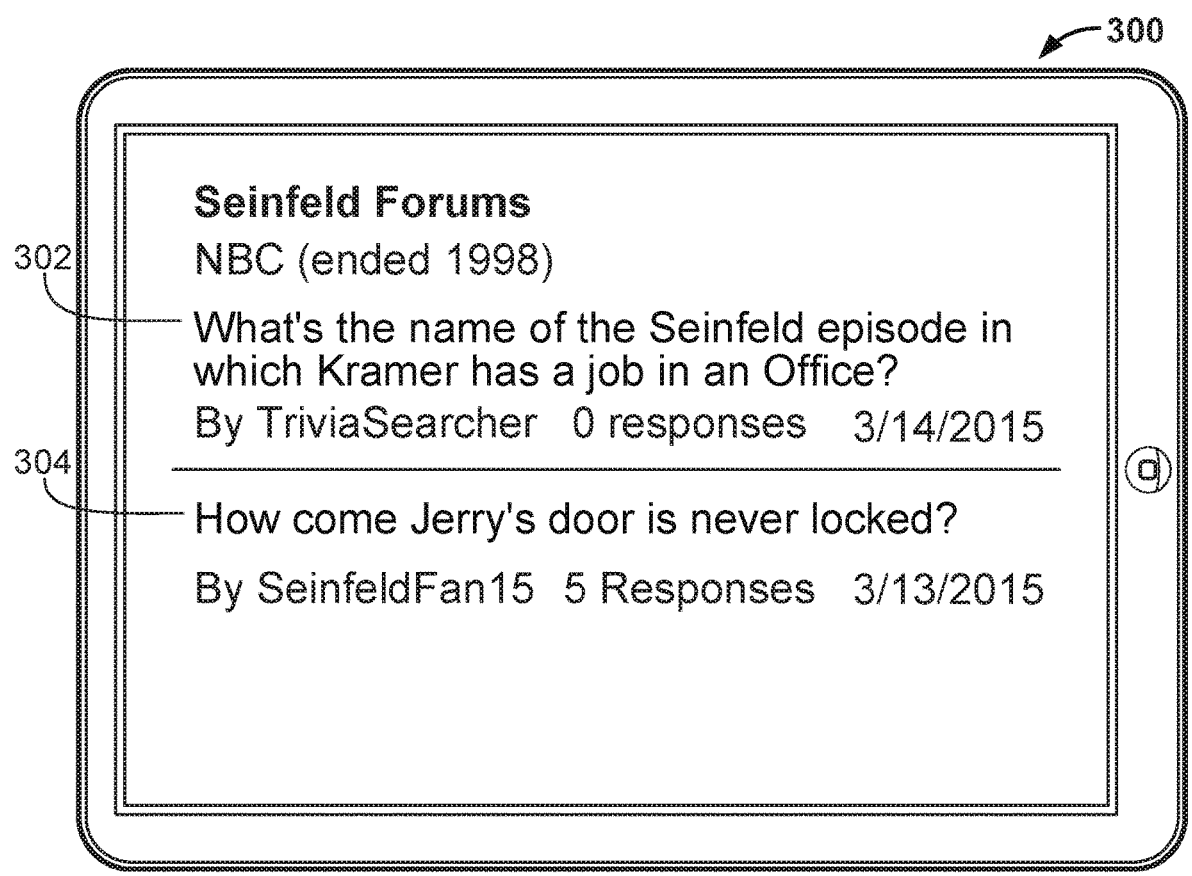
FIG. 3 shows an illustrative example of a display screen that may be generated based on transmitting a second natural language query to an information resource, in accordance with some embodiments of the disclosure.

FIG. 3 shows an illustrative example of a display screen that may be generated based on transmitting a second natural language query to an information resource, in accordance with some embodiments of the disclosure. For example, the screen may include second natural language query 202 listed under a question entry 302. The media guidance application may display information relevant to the user, such as the text of second natural language query 302, the number of responses to the question corresponding to the second natural language query, the date that the second natural language query was transmitted, and the like. For context, the media guidance application may display other questions associated with the information resource, such as question entry 304.

In some embodiments, the media guidance application may receive a natural language query locator from the target information resource once the second natural language has been posted. For example, the media guidance application may receive a URL (e.g., http://www.tv.com/shows/seinfeld/forums/kramer-gets-job-233-33931/) corresponding to the location at which second natural language query 202 is posted. The media guidance application may store the locator in the user profile, or in an entry associated with the target information resource locator in the database of information resources, so as to be able to poll it later.

In some embodiments, the media guidance may search the target information resource to determine whether the questions corresponding to second natural language query 202 has previously been answered. For example, the media guidance application may crawl through forum postings and identify a forum topic, the subject text of which is similar to second natural language query 202. The media guidance application may use a process of determining an association metric between second natural language query 202 and each forum topic to identify a topic that is most likely to be relevant to the user's question, using the methods described above in relation to the comparison of first natural language query 106 with second natural language query 202.

In some embodiments, the media guidance application retrieves and generates for display an answer to second natural language query 202 from the target information resource. For example, upon detecting that a user of the "Seinology" website has responded to the question contained in second natural language query 202, the media guidance application may retrieve the answer and generate the answer for display so that the user is provided with an answer to second natural language query 202.

In some embodiments, when retrieving and generating for display the answer to second natural language query 202, the media guidance application detects using the target information resource locator, a submission of the answer to second natural language query 202 at the target information resource. For example, the media guidance application may periodically poll the natural language query locator that the media guidance application previously received. In other examples, the media guidance application may receive a transmission of the answer for second natural language query 202 from the internet resource.

In some embodiments, the media guidance application, in response to detecting the submission of the answer, calculates a reliability metric of the answer. As used herein, the term "reliability metric" is a measure of the likelihood that a given answer is correct and complete. For example, in some internet resources, such as internet forums and social networks, a correct answer to a natural language query usually percolates after a number of users submit an answer to second natural language query 202. A correct answer may be detected using various methods. In one example, users may utilize an "up-vote" function to give weight to an answer that they consider to be correct, such that the number of up-votes associated with the answer determines the reliability metric. As used herein, an "up-voting" reflects the process of a user assigning weight to answers that the user believes to be correct. In another example, the last answer posted in a forum thread of answers may be the correct answer, as no other user may have felt the need to correct or clarify the last answer. In yet another example, a total number of queries previously answered by a user associated with the answer may be considered when determining the reliability metric. Because internet forums usually attract power users, who consider themselves to be subject matter experts in certain specific fields and who actively contribute to discussions in those fields, the media guidance application may consider an answer provided by a user with a high number of queries previously answered to be more accurate than an answer provided by a user who provided only a handful of answers. In another example, should the media guidance application determine a high number of responses generated to second natural language query 202, the media guidance application may calculate a lower reliability metric. This is because a question that generates a large discussion may be controversial or difficult to answer. In fact, it is possible that second natural language query 202 may have several correct answers. In such cases, the media guidance application may transmit the entire set of answers generated in response to second natural language query 202 in order to provide the user with a full set of information from which the user can draw conclusions. The reliability metric may also be determined by the number of views of the answer. For example, if an answer has received a high number of views without subsequent postings attempting to correct or clarify the answer, the media guidance application may determine that a large pool of users determined that the answer was correct and that the users viewing the answer did not have the need to clarify or correct the answer. By calculating the reliability metric of the answer, the media guidance application is able to determine whether the answer is ready to be presented to the user, and whether to continue waiting for a subsequent answer that may clarify or correct the first answer.

In some embodiments, the media guidance application determines whether the reliability metric meets a reliability threshold. As described above, the reliability metric may be calculated using such factors as the number of up-votes associated with the answer, the total number of queries previously answered by a user associated with the answer, and the number of replies posted to the answer. The media guidance application may set thresholds for each factor when making the determination whether the answer is correct (i.e., whether the reliability metric meets a reliability threshold). For example, the media guidance application may determine, based on an analysis of previously answered questions, that a question that has received two up-votes has a fifty percent likelihood of being correct. Accordingly, when basing the reliability metric on up-votes, the media guidance application may then set the reliability threshold to two. Over time, the media guidance application may receive feedback from the user in relation to whether the media guidance is retrieving the correct answers. In such a way, the media guidance application may utilize machine learning processes to determine the threshold automatically. For example, the media guidance application may set the reliability threshold to indicate that the user associated with the answer must have at least five previous responses in order for the media guidance application to consider the respective answer to be correct. Should the user provide feedback to the media guidance application indicating that a number of corresponding answers, posted in response to further natural language queries submitted by the user, is incorrect, the media guidance application may in turn increase the threshold so that the media guidance application only considers an answer to be correct when the associated user had posted at least twenty answers. The media guidance application may also receive an indication from the user with respect to setting a reliability metric threshold. The media guidance application may use one or more reliability metrics and the corresponding reliability metric thresholds to maximize the likelihood that the media guidance application provides the correct answer to the user.

In some embodiments, in response to determining that the reliability metric meets or exceeds the reliability threshold, the media guidance application retrieves the answer from the target information resource. For example, upon detecting that a user of the "Seinfeld Forums" website has responded to the question contained in second natural language query 202, the media guidance application may retrieve the answer and generate the answer for display so that the user is provided with an answer to second natural language query 202.

Figure 4:
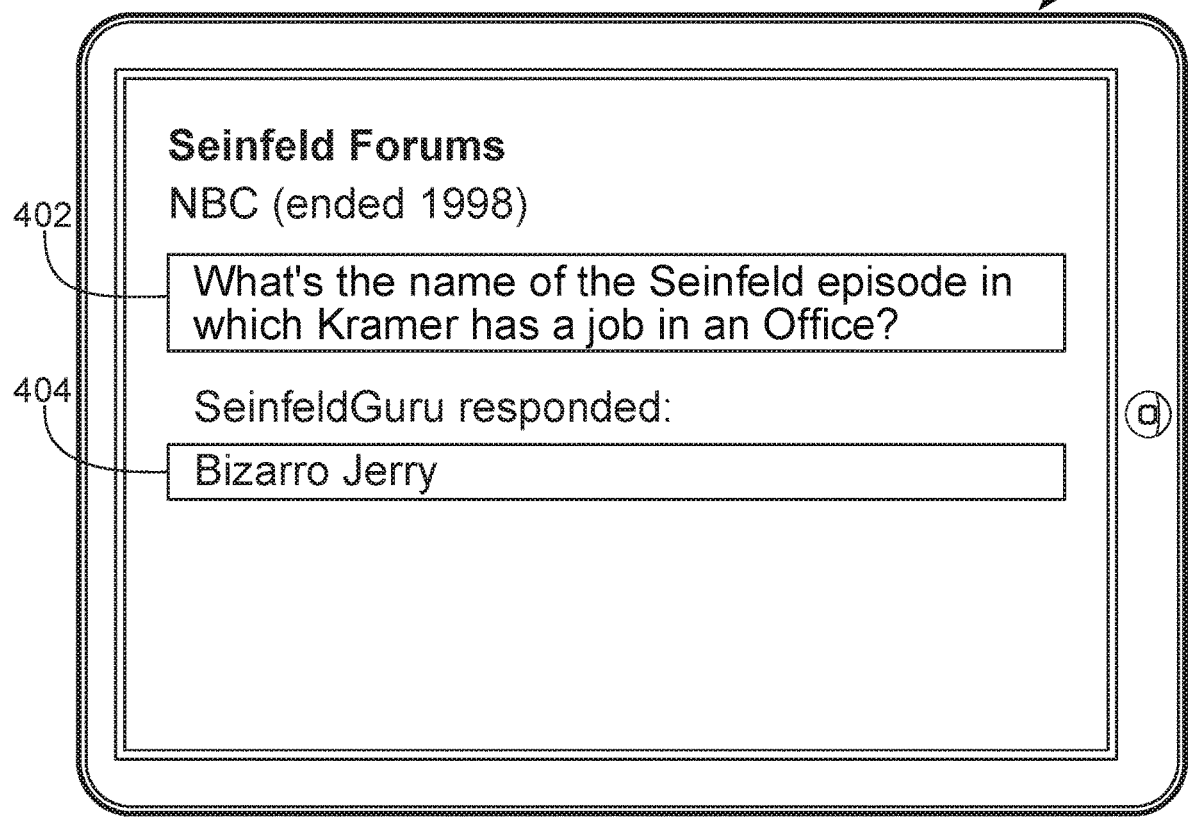
FIG. 4 shows an illustrative example of a display screen that may be used to display the answer to the second natural language query, in accordance with some embodiments of the disclosure.

FIG. 4 shows an illustrative example of a display screen that may be used to display the answer to the second natural language query, in accordance with some embodiments of the disclosure. In some embodiments, in response to determining that the reliability metric meets or exceeds the reliability threshold, the media guidance generates for display the answer to second natural language query 202. For example, the media guidance application may detect that a user of the "Seinfeld Forums" website has provided an answer to second natural language query 202 (e.g., "What's the name of the Seinfeld episode in which Kramer has a job in an office?"). Further, the media guidance application may detect the submission of answer 404 (e.g., "Bizarro Jerry") provided by a user (e.g., "SeinfeldGuru"), and that answer 404 is associated with a high reliability metric, because the associated user has provided one hundred responses in the past. Media guidance application may compare the reliability metric to a threshold (e.g., fifty answers), and may retrieve the answer from the server. The media guidance application may then generate answer 404 on the display screen 400. The media guidance application may present additional information that may be helpful in describing the context of the answer to the user, such as the name of the user who provided the answer and the name of the target information resource.

Figure 5:
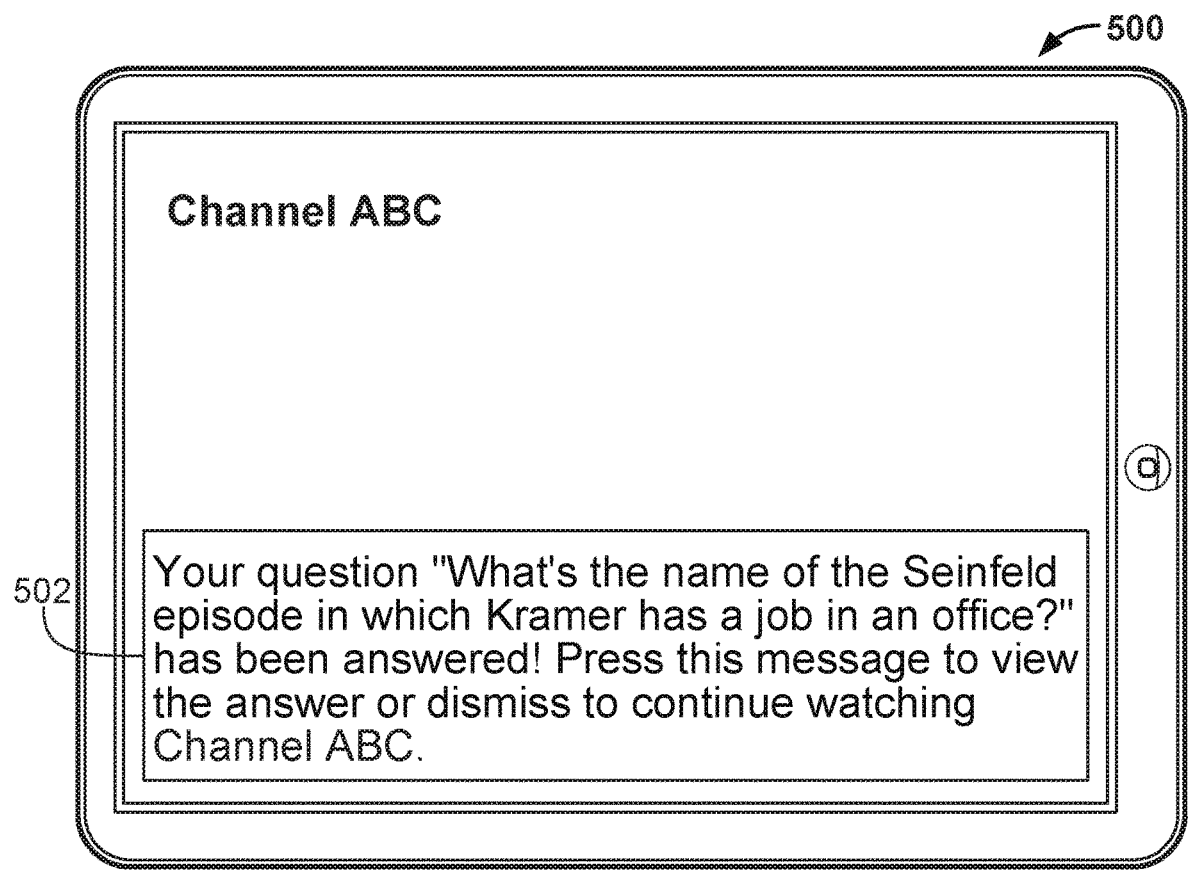
FIG. 5 shows an illustrative example of a display screen generated by the media guidance application in response to retrieving an answer to the second natural language query, in accordance with some embodiments of the disclosure.

FIG. 5 shows an illustrative example of a display screen generated by the media guidance application in response to retrieving an answer to the second natural language query, in accordance with some embodiments of the disclosure. For example, upon detecting that answer 404 is available, media guidance application may alert the user. For example, media guidance application may display message 502 to alert the user that the media guidance application has retrieved an answer to second natural language query 202. Message 502 may be overlaid on top of playing media. The media guidance application may then receive a selection of message 502. In response, media guidance application may generate for display a screen such as that depicted in FIG. 4 or FIG. 5, discussed below. Should media guidance application detect that the user is currently not interacting with the media guidance application or user equipment, media guidance application may generate for display message 502 at the next occasion during which the user begins interacting with media guidance application.

Figure 6:
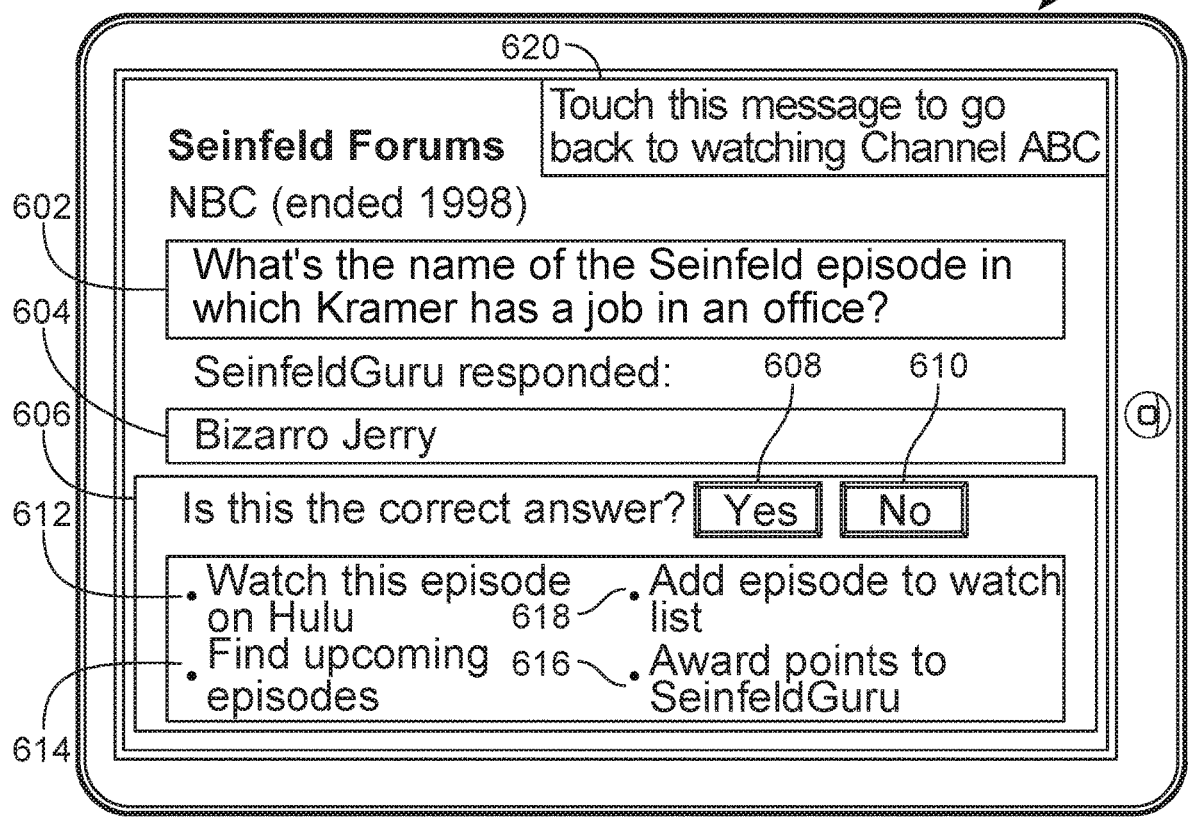
FIG. 6 shows another illustrative example of a display screen that may be used to display the answer to the second natural language query, in accordance with some embodiments of the disclosure.

FIG. 6 shows another illustrative example of a display screen that may be used to display the answer to the second natural language query, in accordance with some embodiments of the disclosure. In some embodiments, in response to determining that the reliability metric meets or exceeds the reliability threshold, the media guidance generates for display the answer to second natural language query 202. Media guidance application may generate for display area 606 with selectable options for interacting with answer 604.

For example, the media guidance application may generate for display options 608 and 610 to enable the user to provide feedback with respect to answer 604. For example, when the media guidance application receives a selection of option 608 ("No", in response to the question regarding the accuracy of answer 605), the media guidance application may use the feedback to adjust a threshold, as discussed above. The media guidance application may also generate for display options 612, 614, 616, and 618. When receiving a selection of option 612, the media guidance application may launch a video-on-demand application in order to identify the media asset associated with answer 604 (e.g. Seinfeld episode "Bizarro Jerry"). The media guidance application may also search program guide information to identify a corresponding media asset when the media guidance application receives a selection of option 614. The media guidance application may add the media asset corresponding to answer 604 when the media guidance application receives a selection of option 618.

In some embodiments, the media guidance application may present option 608 and option 610 only once the user finishes consumption of the media asset associated with answer 604. For example, the media guidance application may receive a selection of option 612 and may launch a video-on-demand application to play the media asset associated with answer 604. Should the media guidance application determine that the user has finished watching the media asset, the media guidance application may present option 608 and option 610 to determine whether the user considers the answer to be correct. For example, should the user determine that the media asset corresponding to answer 604 (e.g. Seinfeld episode "Bizarro Jerry") contains content relevant to the user's second natural language query 202 (e.g., "What's the name of the Seinfeld episode in which Kramer has a job in an office?"), the user may provide feedback via option 608 indicating that the provided answer 604 was in fact correct. In such a way, the media guidance application may utilize machine learning processes to determine a reliability threshold, as is discussed in detail above. For example, the media guidance application may set the reliability threshold to indicate that the user associated with the answer is reliable and must have three previous responses in order for the media guidance application to consider the respective answer of that user to be correct.

In some embodiments, the media guidance application may enable the user to award points to the user with whom answer 604 is associated. For example, upon receiving a selection of option 616, media guidance may communicate with the information resource which the media guidance application retrieved answer 604 from and indicate that the corresponding user should be awarded points for answering the question correctly. A point system may incentivize expert users to answer questions appearing on information resources.

In some embodiments, once the user is satisfied with the answer, media guidance application may receive an indication associated with area 620, by which the user may express interest in returning to the activity he or she was performing before reviewing the answer to the second natural language query.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 7:
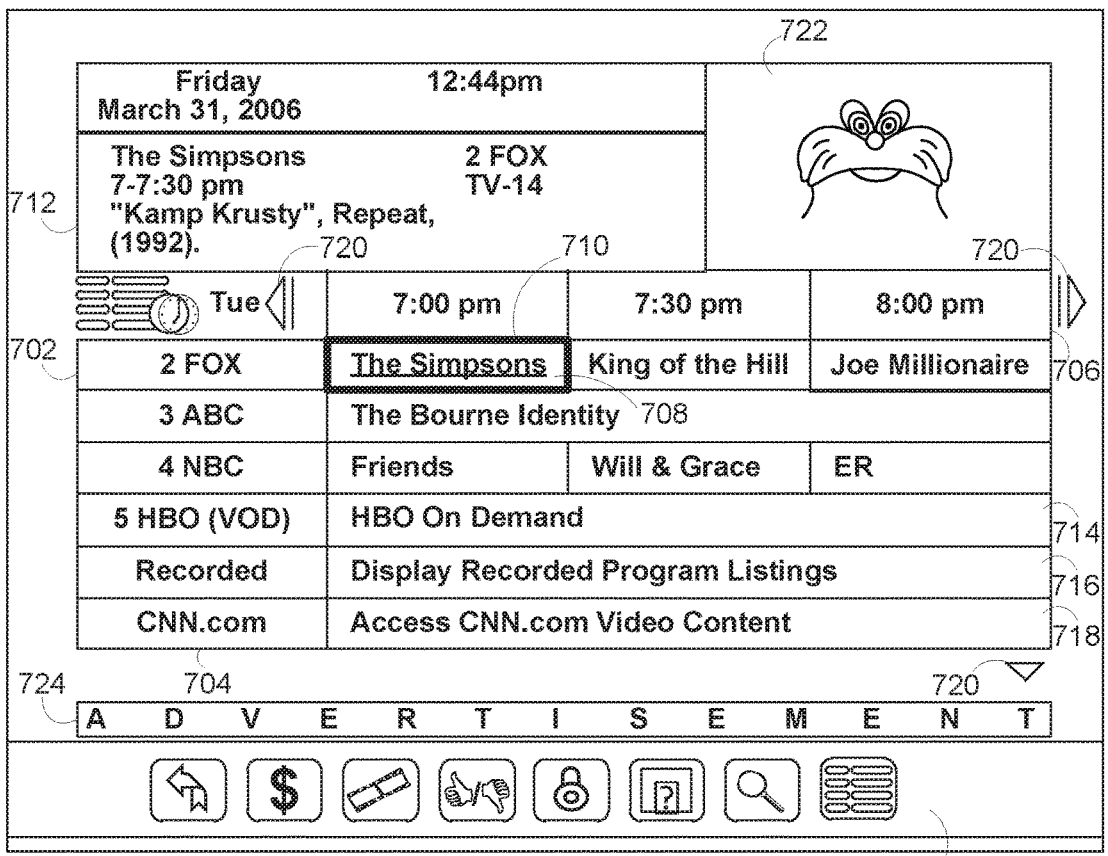
FIG. 7 shows an illustrative embodiment of a display screen that may be used to provide media guidance application listings and other media guidance information, in accordance with some embodiments of the disclosure.
Figure 8:
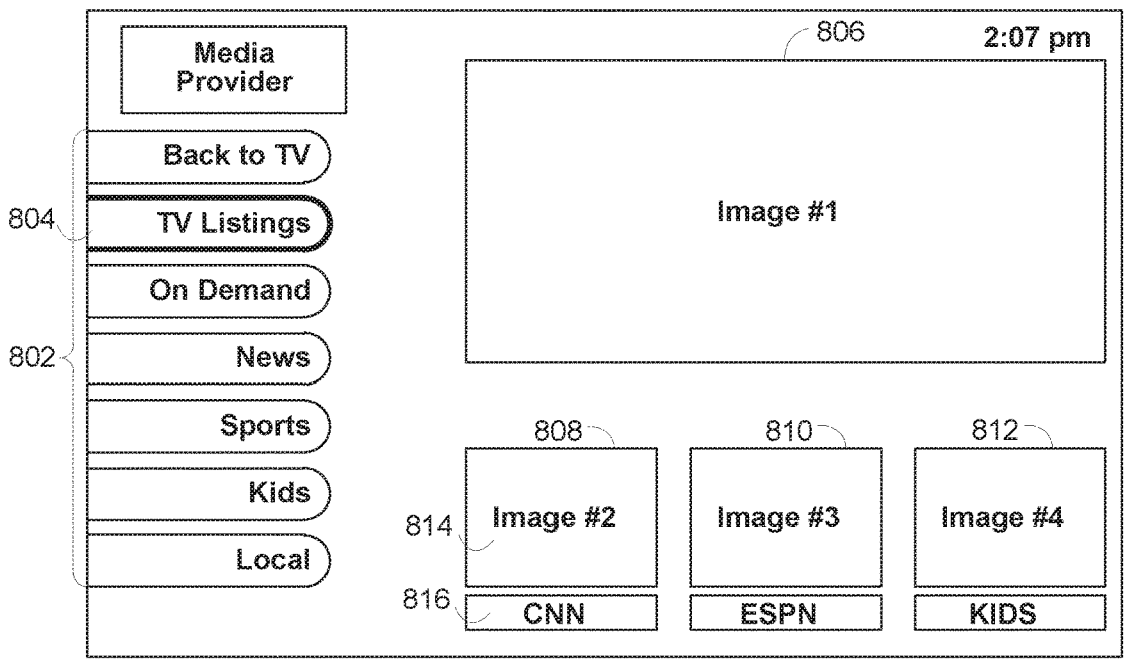
FIG. 8 shows another illustrative embodiment of a display screen that may be used to provide media guidance application listings, in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 726 may allow the user to access different types of content, media guidance application displays, and/ or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 9:
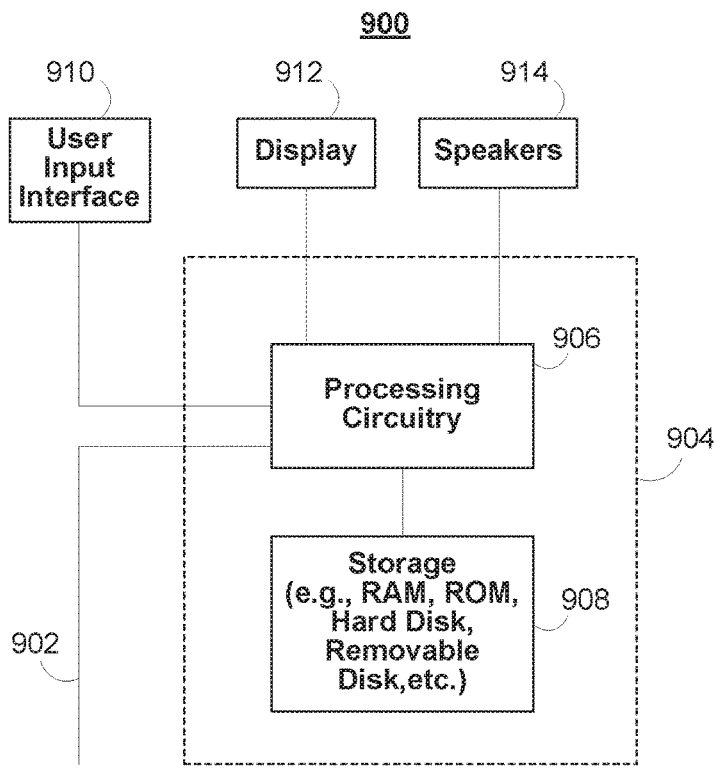
FIG. 9 is a block diagram of an illustrative user equipment (UE) device in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
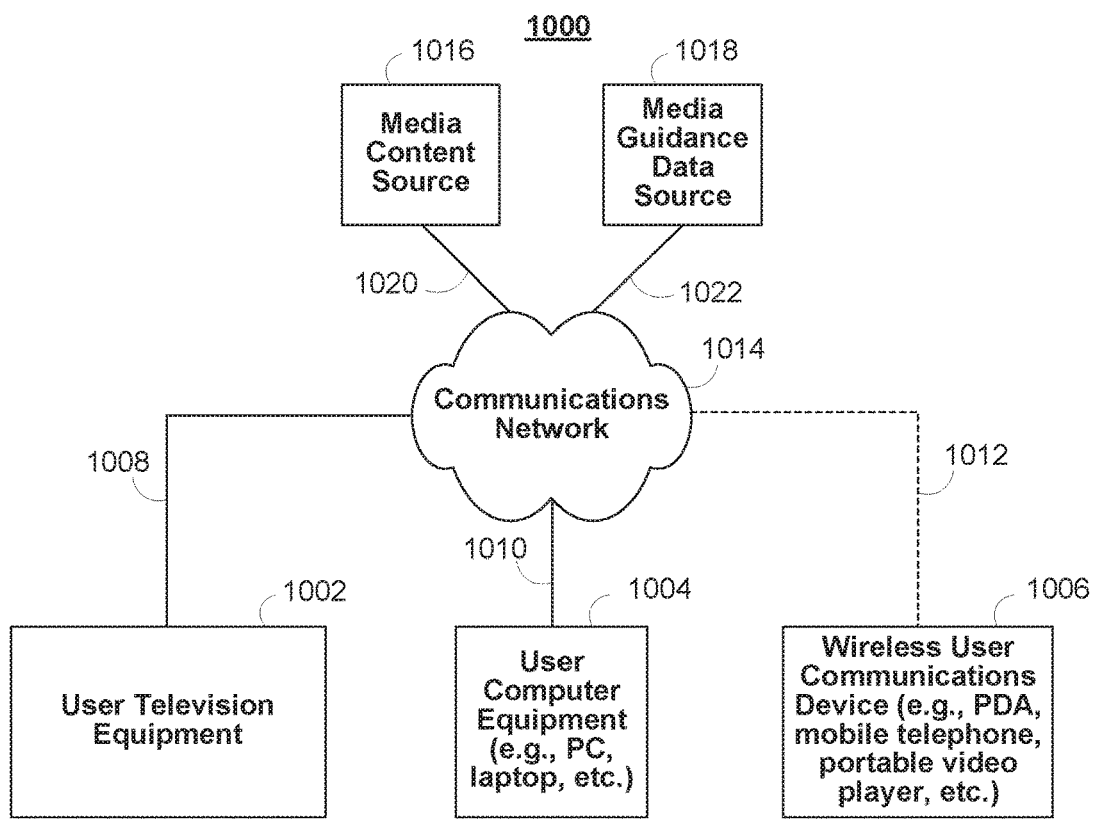
FIG. 10 is a block diagram of an illustrative media system in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
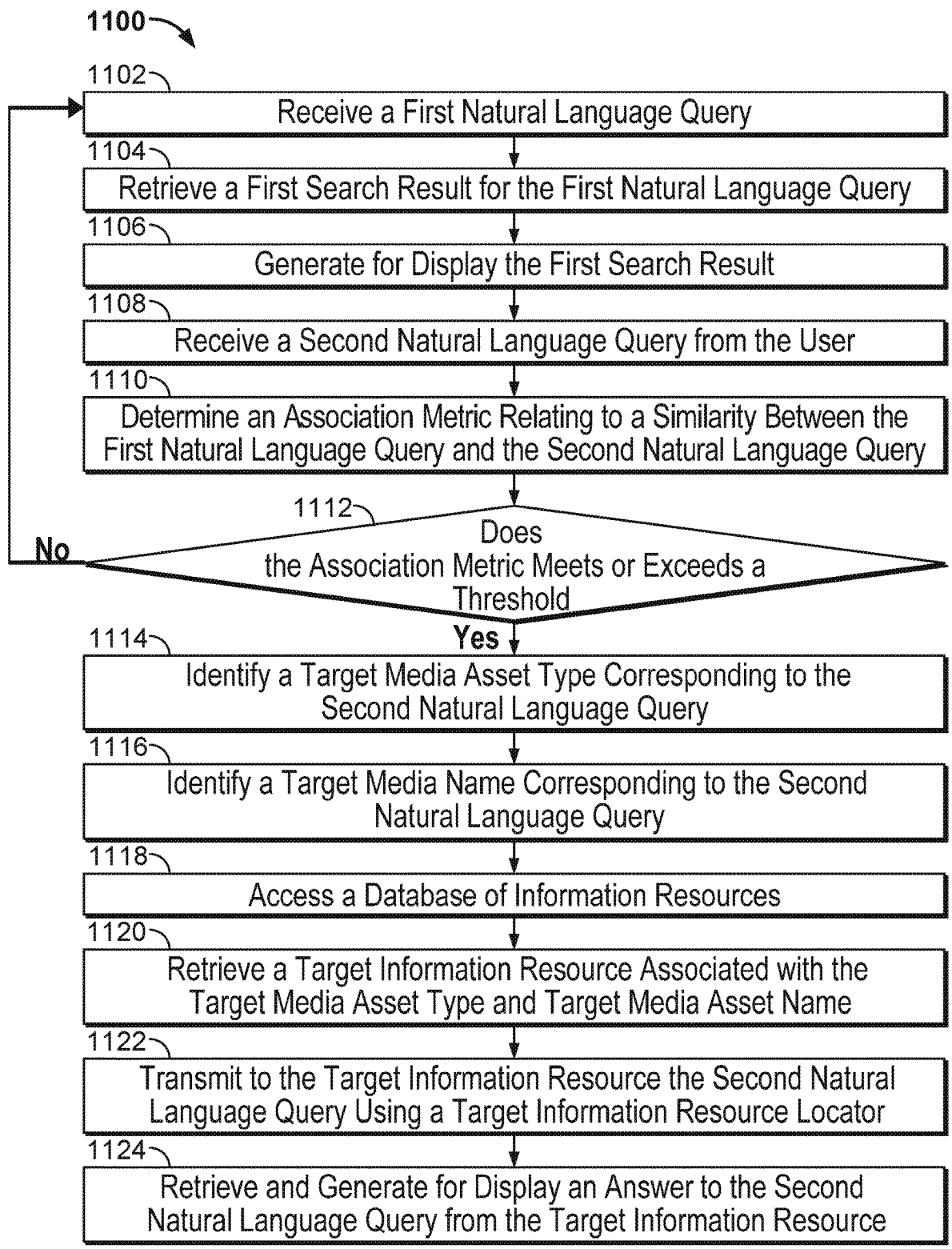
FIG. 11 is a flowchart of illustrative steps for identifying resources for answering natural language queries, in accordance with some embodiments of the disclosure.

FIG. 11 is a flowchart of illustrative steps for identifying resources for answering natural language queries, in accordance with some embodiments of the disclosure. Process 1100 begins at 1102, where control circuitry 904, performing the functions of the media guidance application, receives a first natural language query, such as first natural language query 106. User equipment 102 may include any capability described with respect to user equipment 1002, 1004, and/or 1006. Control circuitry 904 receives first natural language query 106 by way of user input interface 910. For example, as depicted in FIG. 1, control circuitry 904 receives first natural language query 106 (e.g., "What's the name of the Seinfeld episode in which Kramer gets a job?") by way of touch screen 104.

Process 1100 then continues to 1104, where control circuitry 904 retrieves a first search result for the first natural language query. Control circuitry 904 retrieves first search result 110 by way of communications network 1014 from a remote source, such as media guidance data source 1018. Control circuitry 904 retrieves, based on first natural language query 106, data corresponding to result 110 (e.g., a result associated with the Wikipedia entry for "Cosmo Kramer"). Control circuitry 904 retrieves data including a result identifier, a hyperlink associated with the result, and a description of the result, so as to allow the user to quickly determine the relevance of the result.

Process 1100 then continues to 1106, where control circuitry 904 generates for display the first search result. Control circuitry 904 generates for display result 110 (e.g., a result associated with the Wikipedia entry for "Cosmo Kramer") on touch screen 104. Control circuitry 904 enables the user to interact with the result in order to determine the relevance of the result. In the event that the user does not find the result to be relevant, the process continues to 1108.

At 1108, control circuitry 904 receives a second natural language query from the user. For example, control circuitry 904 receives second natural language query 202 by using analogous methods discussed with respect to first natural language query 106 above.

Process 1100 then continues to 1110, where control circuitry 904 determines an association metric relating to a similarity between the first natural language query and the second natural language query. Control circuitry 904 computes a string distance metric between first natural language query 106 and second natural language query 202 to determine whether the user is attempting to generate a relevant result for the same question using queries 106 and 202. For example, control circuitry 904 determines that first natural language query 106 and second natural language query 202 share five words that are common to both queries. Control circuitry 904 sets the association metric to the result of the calculation of dividing the number of words common to both natural language queries by the number of words contained in first natural language query 102. For example, control circuitry 904 determines that second natural language query 202 contains sixteen words. Control circuitry 904 then sets the association metric to the result of dividing the number of words common to both natural language queries 102 and 206 (e.g., six words) by the number of words in second natural language query 202 (e.g., sixteen words). In this example, the result of the calculation is 0.375, and control circuitry 904 sets the association metric to this value.

If, at 1112, control circuitry 904 determines that the association metric meets or exceeds a threshold, process 1110 continues to 1114. Control circuitry 904 first retrieves a threshold stored in a storage device 908, and compares the threshold to the association metric determined in 1110. When the association metric does not meet the threshold, second natural language query 202 is likely directed to a different question than first natural language query 102. Should control circuitry 904 find that the association metric does not meet or exceed the threshold, process 1100 returns to 1102 in order to monitor natural language queries that are subsequently entered by the user.

Process 1100 then continues to 1114, where control circuitry 904 identifies a target media asset type corresponding to the second natural language query. For example, control circuitry 904 analyzes keywords corresponding to second natural language query 202 in order to determine that second natural language query 202 contains the "episode" keyword. Further, control circuitry 904 establishes that a natural language query that contains an "episode" keyword should be associated with a "TV Series" media type. The control circuitry 904 stores, in storage 908, a directory of media asset types. Control circuitry 904 associates, in the directory of media asset types, keywords that correspond to each respective asset type. For example, the control circuitry 904 associates a "TV Series" media type with keywords such as "episode," "season," "finale," and "pilot." Alternatively, control circuitry 904 connects, via communications network 1014, to media guidance data source 1016. In this case, control circuitry 904 the queries media guidance data source to identify the type of media asset that corresponds to the keyword "episode," or any other keyword present in second natural language query 202.

Process 1100 then continues to 1116, where control circuitry 904 identifies a target media name corresponding to the second natural language query. For example, after control circuitry 904 determines that the media type corresponding to the second natural language query 202 is "TV Series," the control circuitry 904 identifies media records in the directory of media asset names, stored in storage 908, that correspond to the "Kramer" keyword of second natural language query 202. For example, control circuitry 904 identifies that the keyword "Kramer" corresponds to the TV Series show "Seinfeld." Control circuitry 904 determines the media asset name using various methods. In one example, control circuitry 904 stores, in the directory of media asset names, a number of corresponding keywords of different attributes, such as "actors," "character names," "episode names," "host," and the like. Control circuitry 904 correlates the media asset name "Seinfeld" to the keyword "Kramer," which is of the "character name" type. In such a way, control circuitry 904 effectively organizes and maintains keywords in the directory of media asset names. As discussed above with relation to 1114, control circuitry 904 may also connect to media guidance data source 1018, should media asset types and media asset names be correlated on a remote server corresponding the media guidance data source 1018.

Process 1100 then continues to 1118, where control circuitry 904 accesses a database of information resources. Each information resource in the database is associated with a media asset type, a media name, and an information resource locator. For example, control circuitry 904 determines that an information resource is associated with a media asset type corresponding to "TV Series," and media name "Seinfeld." The database of information resources is stored in storage 908, but it may also be stored in a remote location accessible via communications network 1014 instead, such as media guidance data source 1018. By identifying and accessing an information resource, the control circuitry 904 is able to locate a highly relevant set of information that is most likely to provide an answer to second natural language query 202.

Process 1100 then continues to 1120, where control circuitry 904 retrieves a target information resource associated with the target media asset type and target media asset name. For example, control circuitry 904 retrieves, from the database stored in storage 908, the name of a target information resource that is associated with a media asset type corresponding to "TV Series" and media name "Seinfeld." For example, control circuitry 904 determines that the information resource name is "Seinfeld Forums," a popular Seinfeld-oriented web site hosted by the website www.TV.com.

Process 1100 then continues to 1122, where control circuitry 904 transmits to the target information resource the second natural language query using a target information resource locator. For example, control circuitry 904 transmits, to the target information resource, second natural language query 202 using a target information resource locator associated with the target information resource. The target information resource locator indicates a location on communications network 1014 that corresponds to the target information resource. For example, control circuitry 904 determines that in order to generate an answer to second natural language query 202 (e.g., "What's the name of the Seinfeld episode in which Kramer has a job in an office?"), control circuitry 904 should transmit second natural language query 202 to a specific target information resource. Control circuitry 904 determines that second natural language query 202 should be transmitted to a popular forum (e.g., "Seinfeld Forums"). The control circuitry 904 then determines a target information resource locator associated with the target information resource. The database of information resources includes an entry corresponding to the target information resource (e.g., "www.tv.com/seinfeld") that indicates the network location to which control circuitry 904 transmits second natural language query 202. The control circuitry 904 then uses an HTTP post command to transmit second natural language query 202 to the target information resource (e.g., www.tv.com/seinfeld).

Process 1100 then continues to 1124, where control circuitry 904 retrieves and generates for display an answer to the second natural language query from the target information resource. When retrieving and generating for display the answer to the first natural language query, control circuitry 904 detects, using the target information resource locator, a submission of answer 404 to second natural language query 202 at the target information resource. Control circuitry 904 periodically polls the target media resource by sending queries over communication network 1014. Once control circuitry 904 retrieves answer 404, control circuitry 904 generates answer 404 for display on display 912 of user equipment 102.

Figure 12:
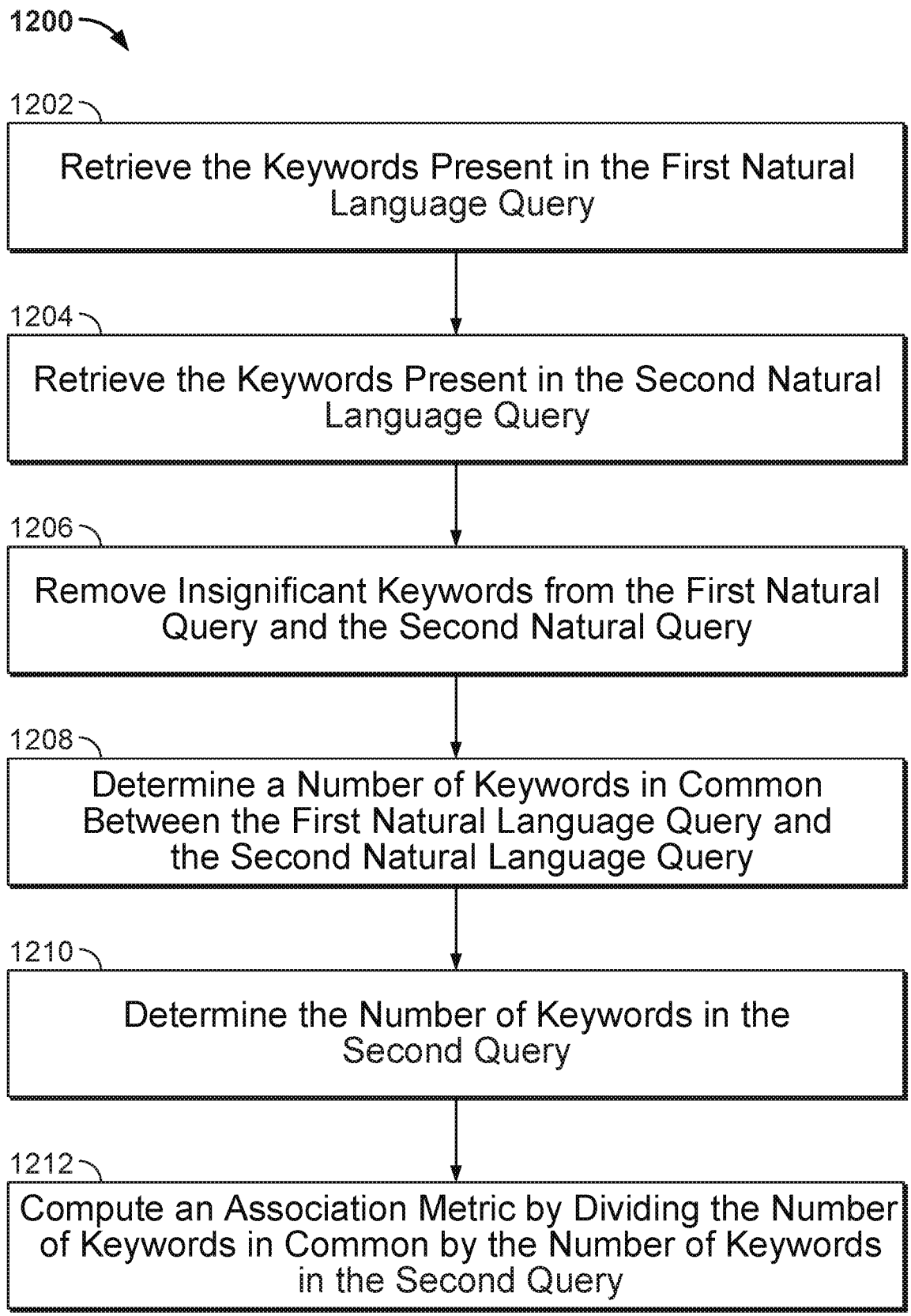
FIG. 12 is a flowchart of illustrative steps for determining an association metric between two natural language queries, in accordance with some embodiments of the disclosure.

FIG. 12 is a flowchart of illustrative steps for determining an association metric between two natural language queries, in accordance with some embodiments of the disclosure. By determining that two natural language queries are similar, control circuitry 904 can infer that the user is unsuccessfully attempting to search for the same question, and control circuitry 904 can route the natural language query to a specific resource that is most likely to provide a prompt and correct answer. Process 1200 begins at 1202, where the control circuitry 904 retrieves the keywords present in first natural language query 106. Using tokenization, control circuitry 904 breaks up first natural language query 106 (e.g., "What's the name of the Seinfeld episode in which Kramer gets a job?") into individual keywords to form a first set of keywords, which includes keywords such as "gets," "Seinfeld," "episode," and "job." control circuitry 904 stores the keywords in a data structure associated with first natural language query 106, in storage 908.

Process 1200 then continues to 1204, where control circuitry 904 retrieves the keywords present in the second natural language query. Control circuitry 904 determines a second set of keywords present in second natural language query 202 (e.g., "What's the name of the Seinfeld episode in which Kramer has a job in an office?") by breaking up second natural language query 202 into individual keywords to form a second set of keywords, which includes keywords such as "has," "Seinfeld," "episode," and "work." As discussed above, control circuitry 904 stores the keywords in a data structure associated with first natural language query 106, in storage 908.

Process 1200 then continues to 1206, where control circuitry 904 removes insignificant keywords from the first natural query and the second natural query. Control circuitry 904 processes each keyword to maximize the probability that non-identical keywords relating to the same concept in both natural language queries are successfully matched. Control circuitry 904 ensures that punctuation is removed from each keyword, because the user relates to the same word by inputting keywords that include arbitrary punctuation structures (e.g., keyword "Kramer's" and keyword "Kramers" both relate to the same concept). Control circuitry 904 also removes the keywords of lowest significance value such as articles (e.g., "a" and "the"), because an article match is unlikely to factor into the similarity determination of two queries. Control circuitry 904 then identifies the parts of speech (e.g., nouns, verbs, adjectives, etc.) to which each keyword belongs to. Control circuitry 904 processes each keyword relating to an identified part of speech such that the keyword appears in the base or infinitive case. Control circuitry 904 detects the keywords "gets" and "got" in the set of keywords. Using a dictionary accessed from storage 908, or on a remote server that control circuitry 904 accesses via communications network 1014, control circuitry 904 determines that both keywords relate to the infinitive word form "have," and replaces both keywords with the infinitive form. In such a way, control circuitry 904 ensures that a user's rephrasing of the same word in both queries can be detected and considered when control circuitry 904 calculates the association metric.

Process 1200 then continues to 1208, where control circuitry 904 determines a number of keywords in common between the first natural language query and the second natural language query. Control circuitry 904 determines that the first set of keywords contains the keywords "name," "Seinfeld," "episode," and "job," and the second set of keywords contains the keywords "name," "Seinfeld," "episode," and "work," control circuitry 904 concludes that three out of the four keywords in the first set are matched and are thus common to both the first natural language query 106 and second natural language query 202.

Process 1200 then continues to 1210, where control circuitry 904 determines the number of keywords in the second query. Control circuitry 904 determines the number of keywords in second natural language query 202 in order to figure out whether the number of keywords in common between first natural language query 106 and second natural language query 202 is significant in view of the length of second natural language query 202. For example, control circuitry 904 calculates a ratio between the number of matched keywords and the number of keywords in the second set corresponding to the second natural language query 202. In this example, second natural language query 202 determines that the number of keywords in the second set is four.

Process 1200 then continues to 1212, where control circuitry 904 computes an association metric by dividing the number of keywords in common by the number of keywords in the second query. Thus, control circuitry 904 calculates a ratio between the number of matched keywords and the number of keywords in the second set that is useful in determining whether the first natural language query 106 and second natural language query 202 are directed to the same question. Thus, control circuitry 904 calculates the value of the ratio as 0.75. Control circuitry 904 may then associate the value of the ratio with the association metric to subsequently determine whether the similarity of the two queries meets or exceeds a threshold.

Figure 13:
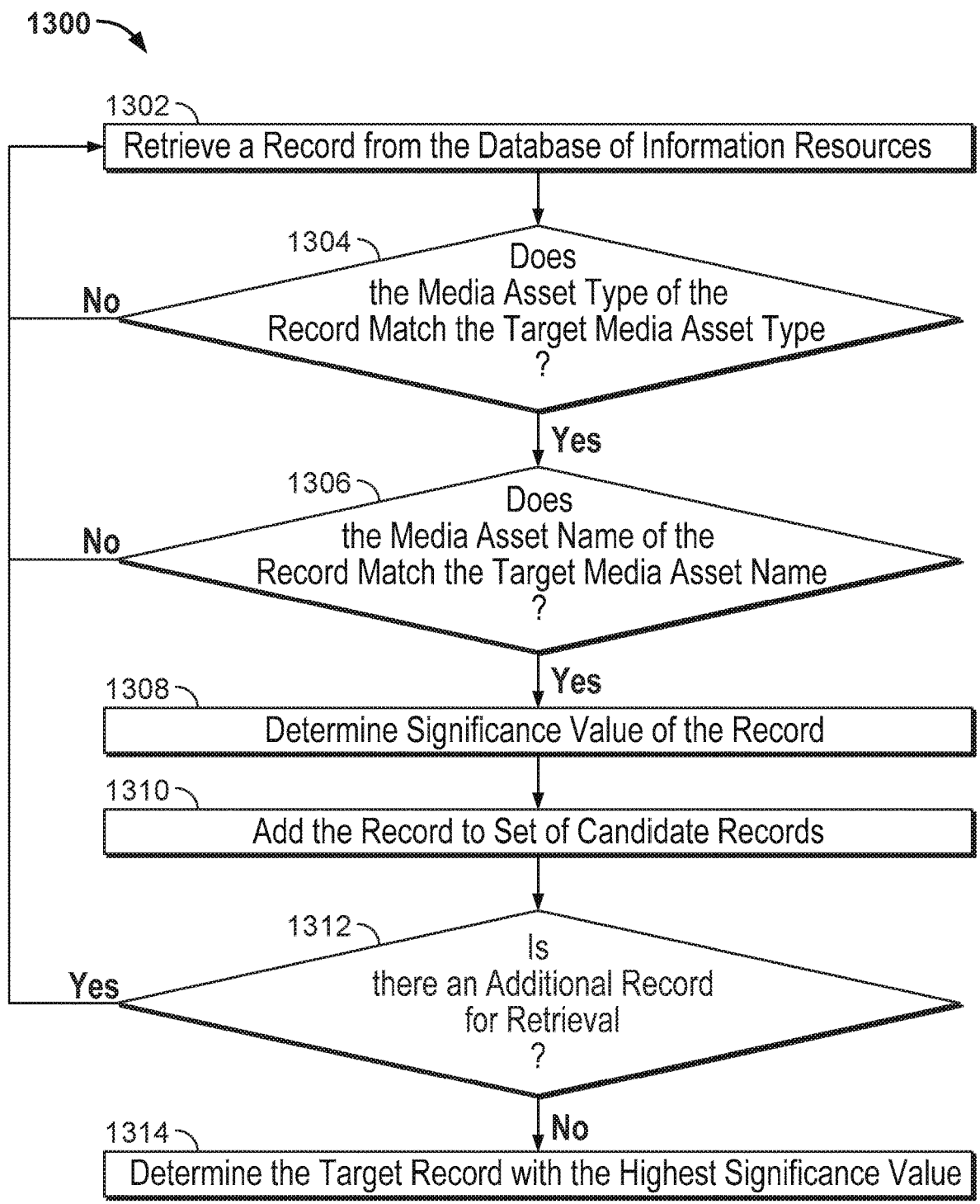
FIG. 13 is a flowchart of illustrative steps for determining an information resource associated with a target record, in accordance with some embodiments of the disclosure.

FIG. 13 is a flowchart of illustrative steps for determining an information resource associated with a target record. Process 1300 begins at 1302, where control circuitry 904 retrieves a record from the database of information resources. The database is stored in storage 908, however, the database may be located in a server accessible through communications network 1014, such as a server associated with media guidance data source 1018. Control circuitry 904, after retrieving the record from the database, determines that the record contains fields describing a media asset type, a media asset name, and an information resource, however, control circuitry 904 may retrieve other data related to the information in the record.

At 1304, control circuitry 904 determines whether the media asset type of the record matches the target media asset type. Control circuitry 904 first determines that the target media asset type of second natural language query 202 is "TV Series," as previously described in relation to FIG. 2. Control circuitry 904 then determines whether the field corresponding to the media asset type of the retrieved record matches the target media asset type (e.g., "TV Series"), and process 1300 proceeds to 1306. Should control circuitry 904 determine that the media asset type of the retrieved record does not match the target media asset type, process 1300 returns to 1302.

If, at 1306, control circuitry 904 determines that the media asset name of the record match the target media asset name, process 1300 proceeds to 1308. For example, control circuitry 904 determines that the target media asset name of second natural language query 202 is "Seinfeld," as previously described in relation to FIG. 2. Control circuitry 904 then determines whether the field corresponding to the media asset name of the retrieved record matches the target media asset type (e.g., "Seinfeld"), and process 1300 proceeds to 1308. Should control circuitry 904 determine that the media asset name of the retrieved record does not match the target media asset type, process 1300 returns to 1302.

Process 1300 then continues to 1308, where control circuitry 904 determines a significance factor of the record. Control circuitry 904 first retrieves an information resource (e.g., "Seinfeld Forums") that corresponds to the record. Control circuitry 904 calculates a significance value associated with the first potential target information resource, wherein the first significance value predicts whether second natural language query 202 will be answered correctly and promptly using the information resource associated with the record. Control circuitry 904 calculates the significance value based on a membership count associated with the information resource associated with the record. Control circuitry 904 determines the membership count by querying a server using communications network 1014. When control circuitry 904 calculates the first significance value based on the membership count associated with the target information resource, a high membership count is indicative of a higher significance value. Control circuitry 904 sets the significance value to a ratio reflecting a proportion of the membership count associated with the target information resource and a predetermined membership count associated with a group of information resources known to host large communities of users who provide quick and prompt replies to queries.

Process 1300 then continues to 1310, where control circuitry 904 adds the record to a set of candidate records.

Control circuitry 904 stores the record in a set of candidate records in storage 908. The process then continues to 1312.

If, at 1312, control circuitry 904 determines that an additional record for retrieval exists in the database, process 1300 returns to 1302. Otherwise, process 1300 proceeds to 1314.

At 1304, control circuitry 904 determines the target record with the highest significance value. Control circuitry queries database 908 to identify two records from the set of candidate records. Control circuitry 904 then compares the significance value of the first record (e.g., "Seinfeld Forums") and determines that the significance value is greater than the significance value of the second record (e.g., Seinology").

It should be noted that processes 1100-1300 or any step thereof could be performed on, or provided by, any of the devices shown in FIG. 1 and FIGS. 9-10. For example, any of processes 1100-1300 may be executed by control circuitry 904 (FIG. 9) as instructed by control circuitry implemented on user equipment 1002, 1004, and/or 1006 (FIG. 10) in order to ensure media borrowed by a user is returned to its rightful owner. In addition, one or more steps of processes 1100-1300 may be incorporated into or combined with one or more steps of any other process or embodiment.

It is contemplated that the steps or descriptions of each of FIGS. 11-13 may be used with any other embodiment of this disclosure. In addition, the steps and descriptions described in relation to FIGS. 11-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 and FIGS. 9-10 could be used to perform one or more of the steps in FIGS. 11-13.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining whether an estimated time of arrival precedes a broadcast time of a preferred program may be performed, e.g., by processing circuitry 906 of FIG. 9. The processing circuitry, for instance, may be a general purpose processor, a customized integrated circuit (e.g., an ASIC), or a field-programmable gate array (FPGA) within user equipment 900, media content source 1016, or media guidance data source 1018. For example, a user profile, as described herein, may be stored in, and retrieved from, storage 908 of FIG. 9, or media guidance data source 1018 of FIG. 10. Furthermore, processing circuitry, or a computer program, may update settings associated with a user, such as a register of media assets stored on user equipment, updating the information stored within storage 908 of FIG. 9 or media guidance data source 1018 of FIG. 10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for identifying information resources for answering natural language queries, the method comprising:
   receiving a first and a second natural language query from a user;
   in response to determining that the second natural language query is related to the first natural language query:
      identifying a target media asset type corresponding to the second natural language query,
      identifying a target media name corresponding to the second natural language query;
      accessing a database of information resources, wherein each information resource is associated with a media asset type, a media name, and an information resource locator;
      retrieving, from the database of information resources, a target information resource associated with the target media asset type and target media asset name, wherein retrieving the target information resource further comprises:
         retrieving, using the database of information resources, a first potential target information resource associated with the target media asset type and target media asset name;
         retrieving, using the database of information resources, a second potential target information resource associated with the target media asset type and target media asset name;
         calculating a first significance value associated with the first potential target information resource, wherein the first significance value predicts whether the second natural language query will be answered correctly and promptly using the first potential target information resource;
         calculating a second significance value associated with the second potential target information resource wherein the second significance value predicts whether the second natural language query will be answered correctly and promptly using the second potential target information resource;
         determining whether the first significance value is greater than the second significance value; and
         retrieving the first potential target information resource when the first significance value is greater than the second significance value;
      transmitting, to the first potential target information resource, the second natural language query using a target information resource locator associated with the target information resource; and
      retrieving and generating for display an answer to the second natural language query from the first potential target information resource.

2. The method of claim 1, wherein determining whether the second natural language query is related to the first natural language query further comprises:
- computing a string distance metric between the first natural language query and the second natural language query; and
- determining that the second natural language query is related to the first natural language query by calculating a ratio of the computed string distance metric with respect to at least one of the string length of the first natural language query and the string length of the second natural language query.

3. The method of claim 1, wherein determining whether the second natural language query is related to the first natural language query further comprises:
- determining a first set of keywords present in the first natural language query;
- determining a second set of keywords present in the second natural language query; and
- determining that the second natural language query is related to the first natural language query by determining a number of keywords in common between the first set of keywords and the second set of keywords.

4. The method of claim 1, wherein the first potential target information resource locator is an IP address of a second user, and wherein transmitting the second natural language query further comprises:
- determining whether the second user is active by pinging the first potential target information resource;
- receiving a message, from the first potential target information resource, indicating that the second user is not active;
- selecting a second target resource associated with a third user in response to receiving the message; and
- transmitting, to the second target resource, the second natural language query using a second target information resource locator associated with the second target resource.

5. The method of claim 1, where the first significance value is calculated based on at least one of a membership count associated with the target information resource, a question-answer rate associated with the target information resource, an average answer time associated with the target information resource, and a user preference value associated with the target information resource.

6. The method of claim 1, wherein transmitting the second natural language query further comprises:
- determining that the first potential target information resource requires authentication;
- identifying an authentication key associated with the first potential target information resource;
- transmitting the authentication key using the target information resource locator; and
- receiving a confirmatory message from the target information resource in response to transmitting the authentication key; and
- in response to receiving the confirmatory message, transmitting, to the first potential target information resource, the second natural language query using the target information resource locator associated with the target information resource.

7. The method of claim 6, wherein identifying the authentication key further comprises searching a profile associated with the user to identify a username and password combination associated with the first potential target information resource.

8. The method of claim 1, wherein retrieving and generating for display the answer to the second natural language query further comprises:
- detecting, using the target information resource locator, a submission of the answer to the second natural language query at the first potential target information resource;
- in response to detecting the submission of the answer, calculating a reliability metric of the answer;
- determining whether the reliability metric meets a reliability threshold; and
- in response to determining that the reliability metric meets or exceeds the reliability threshold:
  - retrieving the answer from the first potential target information resource, and
  - generating for display the answer to the second natural language query.

9. The method of claim 8, wherein the reliability threshold is based on at least one of a number of up-votes associated with the answer, a total number of queries previously answered by a user associated with the answer, and a number of replies posted to the answer.

10. A system for identifying information resources for answering natural language queries, the system comprising control circuitry configured to:
- receive a first and a second natural language query from a user;
- in response to determining that the second natural language query is related to the first natural language query:
- identify a target media asset type corresponding to the second natural language query,
- identify a target media name corresponding to the second natural language query; accessing a database of information resources, wherein each information resource is associated with a media asset type, a media name, and an information resource locator;
- retrieve, from the database of information resources, a target information resource associated with the target media asset type and target media asset name, wherein the control circuitry, when retrieving the target information resource, is further configured to:
  - retrieve, using the database of information resources, a first potential target information resource associated with the target media asset type and target media asset name;
  - retrieve, using the database of information resources, a second potential target information resource associated with the target media asset type and target media asset name;
  - calculate a first significance value associated with the first potential target information resource, wherein the first significance value predicts whether the second natural language query will be answered correctly and promptly using the first potential target information resource;
  - calculate a second significance value associated with the second potential target information resource wherein the second significance value predicts whether the second natural language query will be answered correctly and promptly using the second potential target information resource;
  - determine whether the first significance value is greater than the second significance value; and
  - retrieve the first potential target information resource when the first significance value is greater than the second significance value;

transmit, to the first potential target information resource, the second natural language query using a target information resource locator associated with the first potential target information resource; and retrieve and generating for display an answer to the second natural language query from the first potential target information resource.

11. The system of claim 10, wherein the control circuitry is further configured, when determining whether the second natural language query is related to the first natural language query, to:

compute a string distance metric between the first natural language query and the second natural language query; and determine that the second natural language query is related to the first natural language query by calculating a ratio of the computed string distance metric with respect to at least one of the string length of the first natural language query and the string length of the second natural language query.

12. The system of claim 10 wherein the control circuitry is further configured, when determining whether the second natural language query is related to the first natural language query, to:

determine a first set of keywords present in the first natural language query;

determine a second set of keywords present in the second natural language query; and determine that the second natural language query is related to the first natural language query by determining a number of keywords in common between the first set of keywords and the second set of keywords.

13. The system of claim 10, wherein the first potential target information resource locator is an IP address of a second user, and wherein the control circuitry is further configured, when transmitting the second natural language, to:

determine whether the second user is active by pinging the first potential target information resource;

receive a message, from the first potential target information resource, indicating that the second user is not active;

select a second target resource associated with a third user in response to receiving the message; and transmit, to the second target resource, the second natural language query using a second target information resource locator associated with the second target resource.

14. The system of claim 10, where the first significance value is calculated based on at least one of a membership count associated with the target information resource, a question-answer rate associated with the target information resource, an average answer time associated with the target information resource, and a user preference value associated with the target information resource.

15. The system of claim 10, wherein the control circuitry is further configured, when transmitting the second natural language query, to:

determine that the first potential target information resource requires authentication;

identify an authentication key associated with the first potential target information resource;

transmit the authentication key using the target information resource locator; and receiving a confirmatory message from the first potential target information resource in response to transmitting the authentication key; and in response to receiving the confirmatory message, transmit, to the first potential target information resource, the second natural language query using the target information resource locator associated with the target information resource.

16. The system of claim 15, wherein the control circuitry is further configured, when identifying the authentication key, to search a profile associated with the user to identify a username and password combination associated with the first potential target information resource.

17. The system of claim 10, wherein the control circuitry is further configured, when retrieving and generating for display the answer to the second natural language query, to:

detect, using the target information resource locator, a submission of the answer to the second natural language query at the first potential target information resource;

in response to detecting the submission of the answer, calculate a reliability metric of the answer;

determine whether the reliability metric meets a reliability threshold; and in response to determining that the reliability metric meets or exceeds the reliability threshold:

retrieve the answer from the first potential target information resource, and generate for display the answer to the second natural language query.

18. The system of claim 17, wherein the reliability threshold is based on at least one of a number of up-votes associated with the answer, a total number of queries previously answered by a user associated with the answer, and a number of replies posted to the answer.

19. The method of claim 1, wherein determining whether the first natural language query is related to the second natural language query comprises:

receiving the first natural language query from the user;

retrieving a first search result for the first natural language query;

generating for display the first search result;

receiving the second natural language query from the user;

determining an association metric relating to a similarity between the first natural language query and the second natural language query;

determining whether the association metric meets or exceeds a threshold; and determining that the first natural language query is related to the second natural language query in response to determining that the association metric meets or exceeds the threshold.

20. The system of claim 10, wherein the control circuitry is further configured, when determining whether the first natural language query is related to the second natural language query, to:

receive the first natural language query from the user;

retrieve a first search result for the first natural language query;

generate for display the first search result;

receive the second natural language query from the user;

determine an association metric relating to a similarity between the first natural language query and the second natural language query;

determine whether the association metric meets or exceeds a threshold; and determine that the first natural language query is related to the second natural language query in response to determining that the association metric meets or exceeds the threshold.

* * * * *